United States Patent
Robin

(10) Patent No.: US 12,005,661 B2
(45) Date of Patent: Jun. 11, 2024

(54) MACHINE FOR THE AUTOMATIC MANUFACTURE OF PNEUMATIC TIRES WITH A "BIASED" CROWN

(71) Applicant: Compagnie Generale Des Etablissements Michelin, Clermont-Ferrand (FR)

(72) Inventor: Vincent Robin, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 210 days.

(21) Appl. No.: 17/782,499

(22) PCT Filed: Nov. 27, 2020

(86) PCT No.: PCT/FR2020/052209
§ 371 (c)(1),
(2) Date: Jun. 3, 2022

(87) PCT Pub. No.: WO2021/123530
PCT Pub. Date: Jun. 24, 2021

(65) Prior Publication Data
US 2023/0010819 A1    Jan. 12, 2023

(30) Foreign Application Priority Data

Dec. 20, 2019  (FR) ...................... 1915248

(51) Int. Cl.
*B29D 30/00* (2006.01)
*B29D 30/30* (2006.01)

(52) U.S. Cl.
CPC ......... *B29D 30/30* (2013.01); *B29D 30/0061* (2013.01); *B29D 2030/3064* (2013.01)

(58) Field of Classification Search
CPC ............................ B29D 30/30; B29D 30/0061
See application file for complete search history.

(56) References Cited

U.S. PATENT DOCUMENTS 2,490,445 A * 12/1949 Kuffler ................... B29D 30/28
156/368
3,016,321 A *  1/1962 Beckadolph ......... B29D 30/247
156/402

(Continued)

FOREIGN PATENT DOCUMENTS

DE       1208877 B    1/1966
EP       0747207 A2   12/1996
(Continued)

*Primary Examiner* — Nicholas R Krasnow
(74) *Attorney, Agent, or Firm* — Dickinson Wright PLLC; Steven C. Hurles

(57) ABSTRACT

The machine includes a tire-building zone for producing, on a drum, a carcass entity that includes a carcass ply with carcass reinforcers. The machine also includes a finishing zone for producing a crown entity that includes a tread, a shaping system for causing the carcass entity to expand radially in order to give it a toroidal shape. In an assembling zone, the crown entity is assembled on the carcass entity. A biasing system interacts, during the shaping, with the carcass reinforcers so as to modify the angular orientation of the carcass reinforcers with respect to the circumferential direction of the drum. An automatic control unit allows a biased-crown tire to be manufactured in this way.

8 Claims, 13 Drawing Sheets

(56) References Cited

U.S. PATENT DOCUMENTS

| | | | | | |
|---|---|---|---|---|---|
| 3,075,570 | A | * | 1/1963 | Garver | B29D 30/247 |
| | | | | | 156/402 |
| 3,607,556 | A | * | 9/1971 | Appleby | B29D 30/3007 |
| | | | | | 156/416 |
| 3,700,526 | A | * | 10/1972 | Brey et al. | B29D 30/44 |
| | | | | | 156/396 |
| 3,746,597 | A | * | 7/1973 | Appleby et al. | B29D 30/58 |
| | | | | | 156/416 |
| 3,779,834 | A | * | 12/1973 | Appleby | B29D 30/3021 |
| | | | | | 156/259 |
| 4,894,103 | A | * | 1/1990 | Bailey | B29D 30/3007 |
| | | | | | 156/111 |
| 4,933,033 | A | * | 6/1990 | Bailey | B29D 30/3007 |
| | | | | | 156/111 |
| 5,354,404 | A | | 10/1994 | Benjamin | |
| 5,635,016 | A | | 6/1997 | Byerley | |

FOREIGN PATENT DOCUMENTS

| | | | |
|---|---|---|---|
| EP | 2789456 | A1 | 10/2014 |
| WO | 2018096511 | A1 | 5/2018 |

\* cited by examiner

MACHINE FOR THE AUTOMATIC MANUFACTURE OF PNEUMATIC TIRES WITH A "BIASED" CROWN

CROSS-REFERENCE TO RELATED APPLICATION

This application claims priority to and the benefit of PCT Patent Application No. PCT/FR2020/052209, filed on Nov. 27, 2020, and entitled "MACHINE FOR THE AUTOMATIC MANUFACTURE OF PNEUMATIC TYRES WITH A 'BIASED' CROWN" and French Patent Application No. FR1915248, filed on Dec. 20, 2019, and entitled "MACHINE FOR THE AUTOMATIC MANUFACTURE OF PNEUMATIC TYRES WITH A 'BIASED' CROWN."

BACKGROUND

1. Field

The present disclosure relates to the field of the manufacture of pneumatic tires.

2. Related Art

The manufacture of pneumatic tires by combining, on the one hand, a first annular entity known as the "carcass entity", which comprises at least one carcass ply containing reinforcing threads which extend in planes that are radial with respect to the central axis of the tire and which is shaped, preferably by inflation, so as to exhibit a toroidal shape, and, on the other hand, a second annular entity known as the "crown entity", which comprises a tread as well as reinforcing plies known as "crown plies" each of which have reinforcing threads running parallel to one another and obliquely with respect to the circumferential direction of the tire at an angle known as the "ply angle", is known.

Superposing with the carcass ply two crown plies which have different ply angles, and therefore respective oblique reinforcing threads that criss-cross one another and criss-cross the reinforcing threads of the carcass ply, advantageously ultimately yields a reinforcement exhibiting triangular reinforcing structures. This reinforcement is furthermore generally supplemented by a hooping belt comprising reinforcing threads which are wound continuously, where appropriate with contiguous turns, substantially in the circumferential direction of the tire.

Such a tire architecture said to have a "radial carcass" offers numerous advantages, notably in terms of roadholding.

Be that as it may, with a view to lightening tires with the aim notably of reducing the fuel consumption of vehicles, there is now renewed interest in a possible simplified architecture which had notably been described in patent FR-1 413 102 filed by the Applicant Company and which is referred to here as a "biased-crown architecture".

SUMMARY

This biased-crown architecture is so called because it is the result of a manufacturing operation notably as described in the aforementioned application and which, in the present description, will be referred to as a "biasing operation" or "biasing" for short, whereby:

first of all, an annular laminated structure is formed by superimposing a carcass ply and a second ply, preferably a crown ply, which straddles just part of said carcass ply in a zone referred to as the "zone of overlap", which part of the carcass ply that corresponds to said zone of overlap is intended in practice to be positioned under a tread to form part of the crown of the tire, and said second ply containing reinforcing threads which are oriented differently from the reinforcing threads contained in the carcass ply, so that, in said zone of overlap, the reinforcing threads of said second ply form a network that is crossed with the reinforcing threads contained in the carcass ply and then, and only then, a shape operation is performed whereby the laminated structure is made to expand radially, for example by inflating it, causing joint extension of the carcass ply and of the second ply in the zone of overlap so that, in said zone of overlap, the reinforcing threads of the carcass ply interact with the reinforcing threads of the second ply during shaping in order to produce, by each forcing a rotation of the respective longitudinal directions of another, a change in the orientation of said reinforcing threads of each of said plies in said zone of overlap. The new orientation of the reinforcing threads of each ply, resulting from this deliberate and controlled reorientation process, is maintained in the finished tire.

Advantageously, through a careful choice of the shaping parameters and of the initial orientation of the reinforcing threads of the carcass ply and of the second ply, in this instance preferably a crown ply, it is possible to control the rotation of the direction of the respective reinforcing threads in each ply and thus, after shaping, obtain the desired final angular orientation for the various reinforcing threads.

Another advantage is that the interaction between reinforcing threads belonging to two distinct plies, which interaction is caused by the crossing of said reinforcing threads that is created by the superposition and joining-together of the plies, occurs, and brings about a change in orientation of the direction of said reinforcing threads, chiefly, or even exclusively, in the zone of overlap and little, if at all, outside of said zone of overlap.

Thus it will be possible for example to maintain a radial orientation of the reinforcing threads of the carcass ply in at least part of the sidewalls of the tire, outside of the zone of overlap.

A notable result of the foregoing is that, within a tire having a biased-crown architecture, one of the two crown plies traditionally used in tires of radial architecture can advantageously be replaced by a biased portion of the carcass ply by using biasing, in the portion of the carcass ply that is situated beneath the tread, in the zone of overlap, to change the orientation of the reinforcing threads of said carcass ply so as to obtain, in said zone of overlap, carcass-ply reinforcing threads that are not radial, that criss-cross with the reinforcing threads of the single remaining crown ply, all the while being sure to maintain, in the sidewalls of the tire, over at least part of said sidewalls of the tire, outside of the zone of overlap, a radial arrangement of said carcass-ply reinforcing threads. This then yields a lightened pneumatic tire which combines the advantages of the radial arrangement of the reinforcers in the sidewall with the advantages of the oblique and crossed arrangement of the reinforcers in the crown.

However, it must be pointed out that existing manufacturing machines, which are optimized for minimizing the cycle time that is needed for manufacturing according to a conventional radial carcass architecture, are ill-suited to producing such a biased-crown architecture.

The objectives assigned to the disclosure therefore seek to overcome the aforementioned disadvantages and to propose a new tire manufacturing machine allowing high-performance production of tires having a biased-crown architecture.

The objectives assigned to the disclosure are achieved by means of a machine for the automatic manufacture of a tire, said machine comprising:

a first zone referred to as "tire-building zone", designed to produce a first annular entity that forms part of the tire, known as the "carcass entity", which comprises at least one carcass ply provided with a first set of filamentary reinforcing elements referred to as "carcass reinforcers", said tire-building zone for this purpose comprising a tire-building drum which has a drum central axis and which is mounted to rotate about said drum central axis, and a first conveying system which is designed to lay the carcass ply on said tire-building drum by winding it over said tire-building drum about the drum central axis so that the carcass reinforcers exhibit, with respect to a circumferential direction of the tire-building drum, a first angular orientation, a second zone referred to as the "finishing zone", designed to produce a second annular entity that forms part of the tire, known as the "crown entity", which comprises at least a tread, said finishing zone for this purpose comprising a shell ring mounted to rotate about a shell-ring central axis, and a second conveying system for laying the tread by winding on the shell ring about the shell-ring central axis, a shaping system designed to perform a shaping operation which causes the carcass entity present on the tire-building drum to expand radially in order to obtain a shaped carcass entity of toroidal shape, a third zone referred to as the "assembling zone", designed to assemble the crown entity concentrically on the shaped carcass entity so as to obtain a tire, said assembling zone for this purpose comprising a transfer device of the transfer-ring type, which is designed to receive the crown entity coming from the shell ring of the finishing zone and transfer said crown entity onto and around the shaped carcass entity, a biasing system which is designed to bring into contact with the carcass entity, prior to the shaping operation, an annular structure referred to as a "biasing structure", which is centered on the drum central axis and provided with a second set of filamentary reinforcing elements referred to as "biasing reinforcers" which exhibit, with respect to the circumferential direction of the drum, a second angular orientation, which is different from the first angular orientation of the carcass reinforcers, said biasing structure extending in such a way as to partially straddle the carcass ply along the drum central axis in a zone referred to as the "zone of overlap" so that during the shaping operation, the biasing reinforcers interact with the carcass reinforcers so as to modify, in the zone of overlap, the angular orientation of said carcass reinforcers with respect to the circumferential direction of the drum and so that in this way there is obtained a shaped and biased carcass entity, an automatic control unit which comprises at least a program enabling automatic execution by the machine of a cycle known as a "biased-crown tire manufacturing cycle" which comprises a step of producing a crown entity in the finishing zone, a step of preparing a shaped and biased carcass entity which step comprises a sub-step of creating a carcass entity in the tire-building zone and then a shaping and biasing sub-step during which said carcass entity coming from the tire-building zone is shaped and biased in order to obtain a shaped and biased carcass entity, said cycle making provision for the step of producing the crown entity to overlap in time with at least part of the step of preparing the carcass entity so that at least part of the production of the crown entity is performed in parallel with the preparation of the carcass entity, and then finally an assembling step during which, in the assembling zone, the transfer device places and fixes the crown entity on the shaped and biased carcass entity so as to obtain a tire.

Advantageously, the machine according to the disclosure allows all of the operations for forming a tire having a biased-crown architecture to be performed in a limited amount of time and a reduced amount of space. The tire coming off the machine is preferably a tire based on raw rubber, ready to be sent for curing in order to vulcanize it.

The mutual proximity of the tire-building, finishing and assembling zones advantageously limits the footprint of the machine according to the disclosure and the amplitude of the movements for transferring the various constituent entities that make up the tire, thereby making it possible to reduce the cycle time and the energy consumption of said machine.

Likewise, the automating of the manufacturing process and the simultaneous performance of the steps in the manufacture of various constituent parts of the tire, in this instance the crown entity on the one hand and the carcass entity on the other hand, allow said cycle time to be optimized.

Furthermore, the modular architecture of the machine proposed notably allows the use of certain mechanical subassemblies that are already known and proven, notably in terms of the creation of the carcass entity and/or creation of the crown entity, thereby contributing to good reliability of the machine and simplifying the integration of said machine into the production facilities and simplifying handover to the operators.

Finally, the machine according to the disclosure may advantageously exhibit a high level of multifunctionality insofar as it is possible to configure said machine in such a way that it is just as able to produce tires having a radial carcass architecture as it is able to produce tires having a biased-crown architecture.

BRIEF DESCRIPTION OF THE DRAWINGS

Further objects, features and advantages of the disclosure will become apparent in more detail on reading the following description and with the aid of the appended drawings, which are provided purely by way of non-limiting illustration, in which.

DETAILED DESCRIPTION

Figure 1:
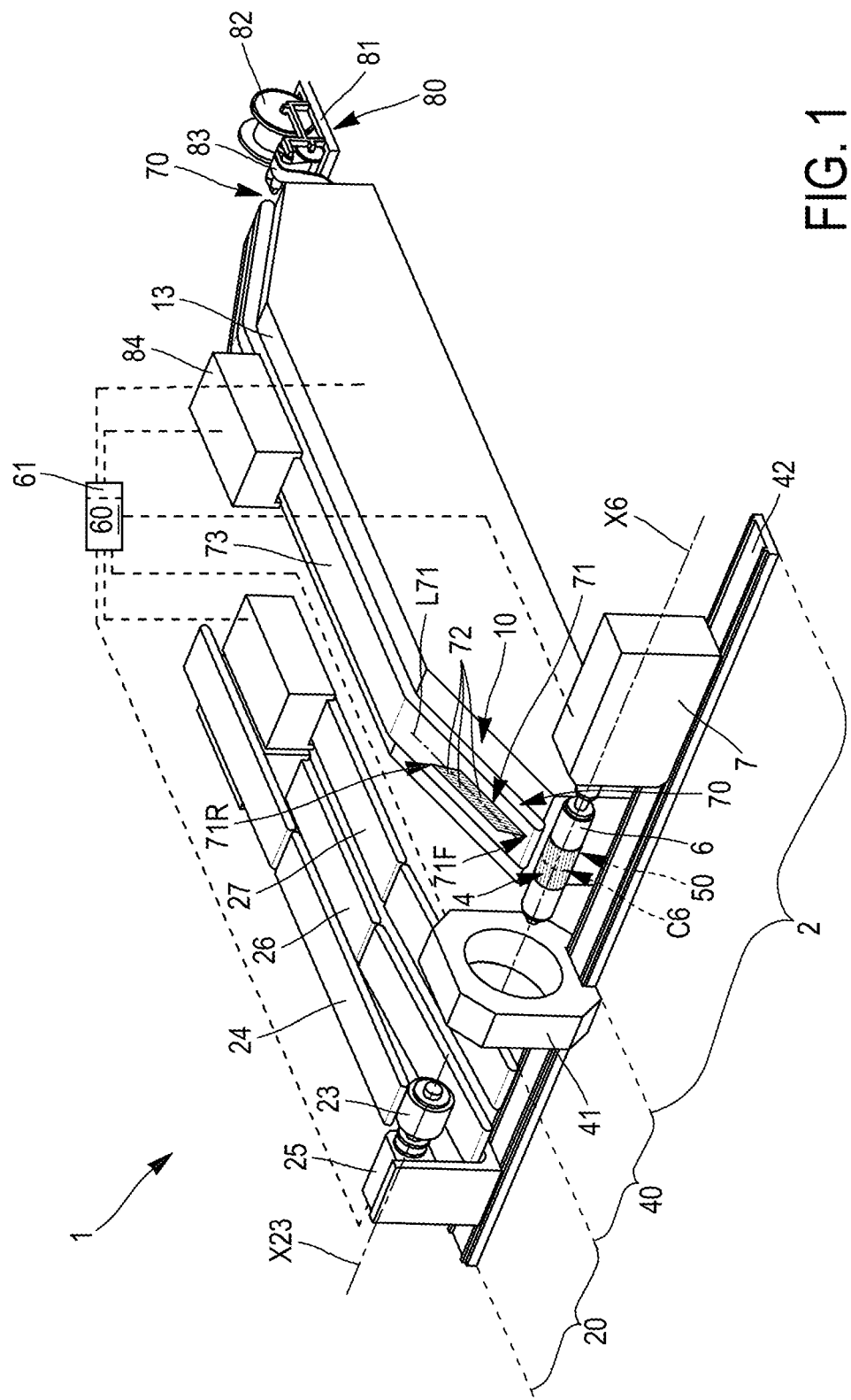
FIG. 1 illustrates, in a perspective view, a first variant of a machine according to the disclosure, in which machine the biasing system uses a crown ply as a biasing structure, and conveys said crown ply to the tire-building zone by means of a conveyor, which is superposed with the conveyor used for conveying the carcass ply as far as the drum, so that the drum can receive the carcass ply and the crown ply successively without the need to modify the axial position of said drum.
Figure 3:
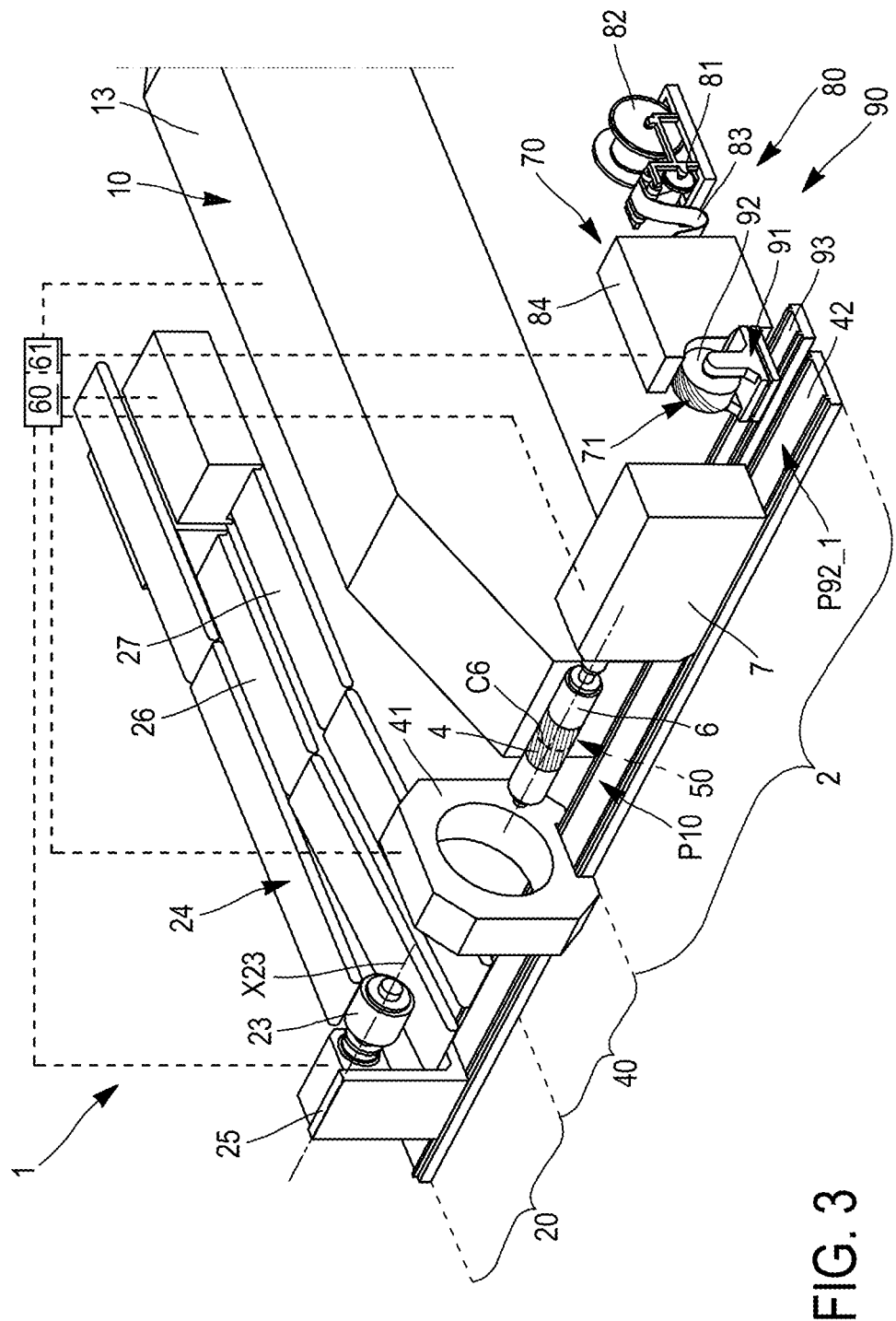
FIG. 3 illustrates, in a perspective view, a second variant of a machine according to the disclosure, in which machine the biasing system here again uses a crown ply as a biasing structure but this time conveys said crown ply to the tire-building zone by means of an auxiliary dispenser, axially occupying a position distinct from that occupied by the conveyor used for conveying the carcass ply as far as the drum.
Figure 6:
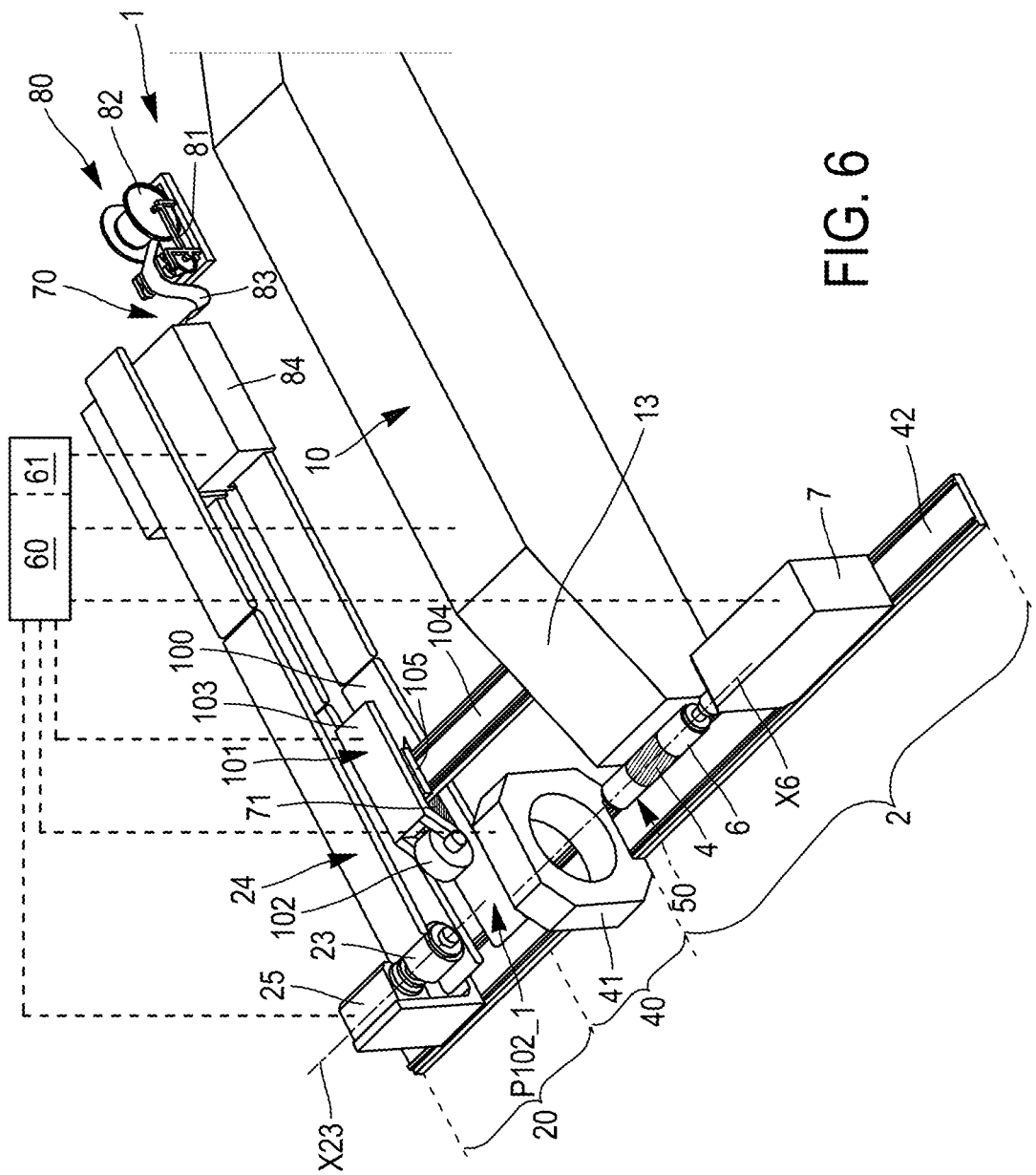
FIG. 6 illustrates, in a perspective view, a third variant of a machine according to the disclosure, in which machine the biasing system once again uses a crown ply as a biasing structure but this time comprises a feed conveyor which conveys said crown ply initially into the finishing zone, and which is supplemented by a distribution device capable of picking up the crown ply from the feed conveyor and redirecting said crown ply to the tire-building zone, bypassing the assembling zone.

The disclosure relates to a machine 1 as illustrated notably in FIGS. 1, 3 and 6, which is intended for the automatic manufacture of a tire, and more preferably for the automatic manufacture of a pneumatic tire.

Figure 2:
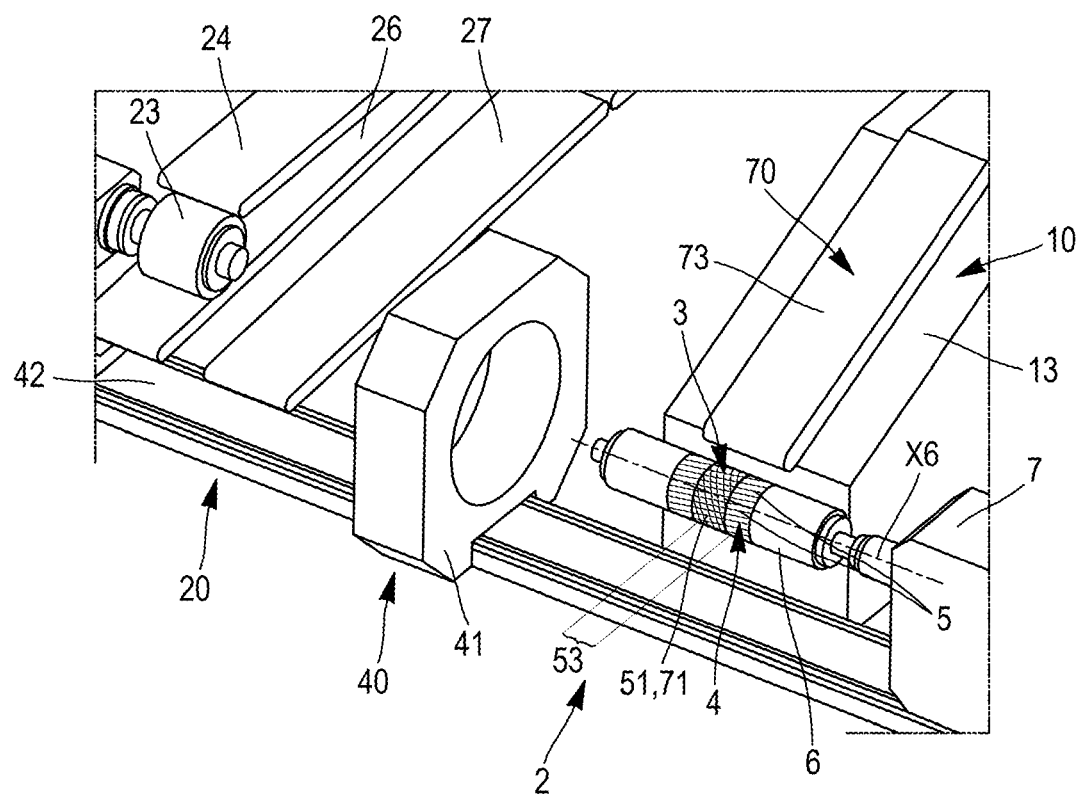
FIG. 2 is a perspective view of the machine of FIG. 1, in which machine, in the tire-building zone, the crown ply conveyed by the conveyor has been wound onto the drum on top of the carcass ply in order to integrate said crown ply with the carcass entity.
Figure 4:
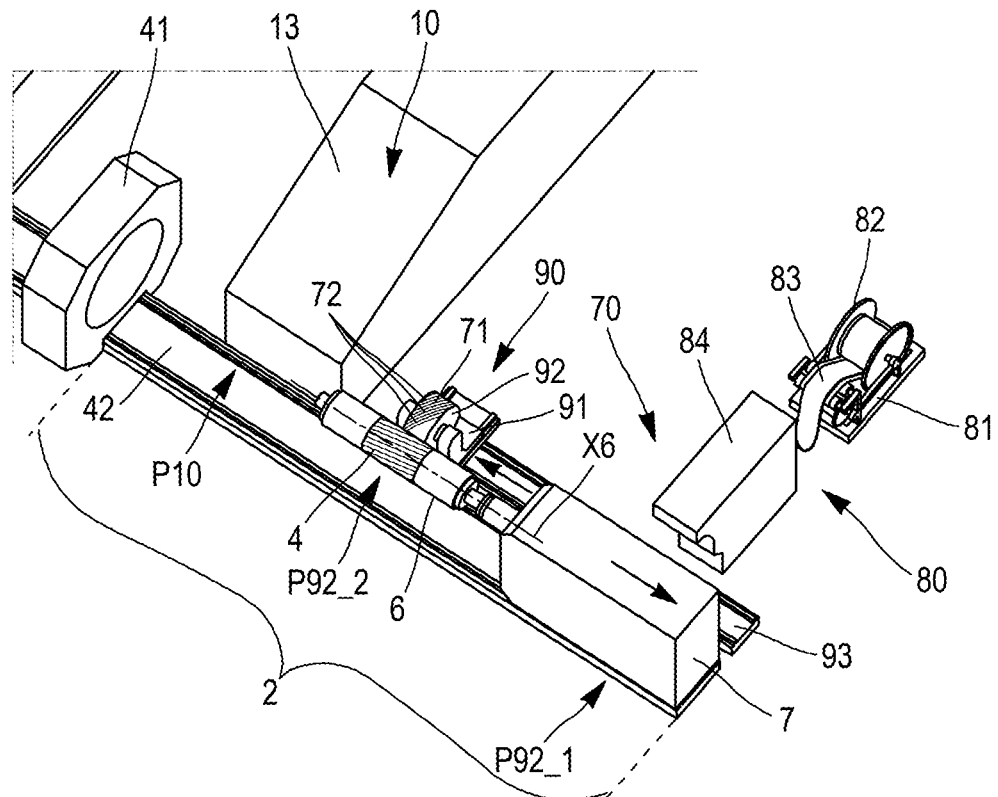
FIG. 4 illustrates, in a perspective view, the machine of FIG. 3 in a configuration in which the auxiliary dispenser, laden with the crown ply, is being presented to face the drum, in the tire-building zone.
Figure 7:
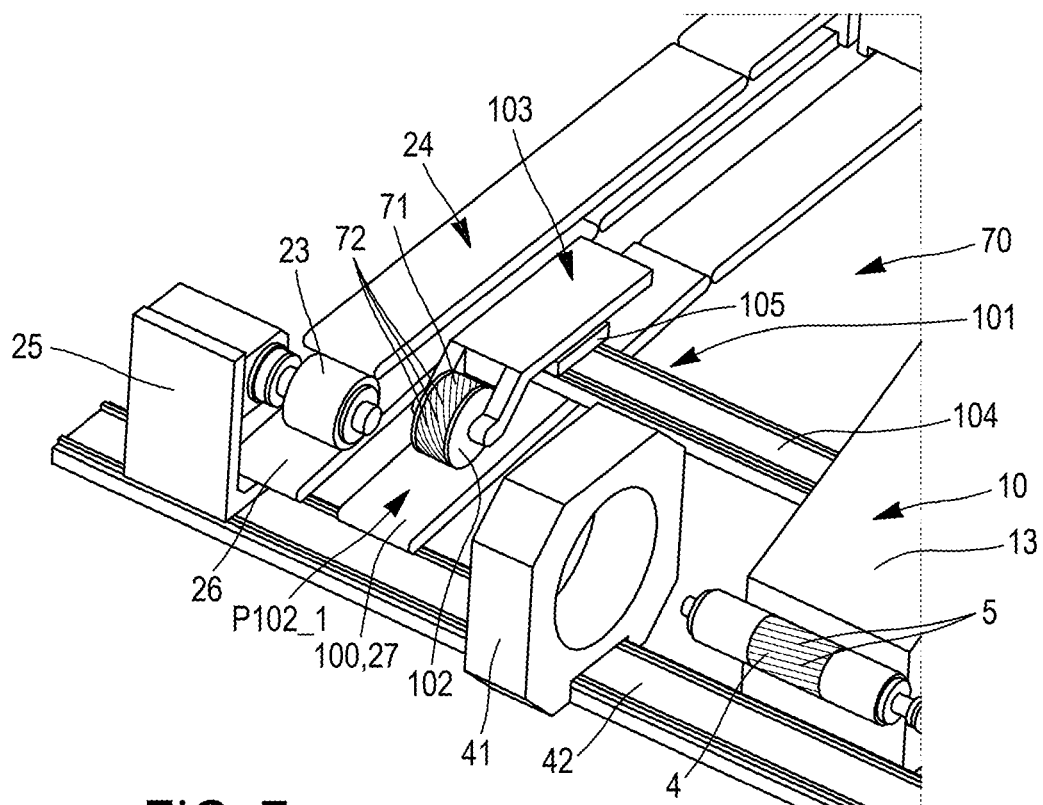
FIG. 7 is a perspective view of the machine of FIG. 6 when the distribution device is picking up the crown ply from the feed conveyor.

Said machine 1 comprises a first zone 2 referred to as "tyre-building zone" 2 designed to produce a first annular entity 3 that forms part of the tire, known as the "carcass entity" 3, which comprises at least one carcass ply 4 provided with a first set of filamentary reinforcing elements 5 referred to as "carcass reinforcers" 5, as is notably visible in FIGS. 2, 4 and 7.

An element said to be "filamentary" means an element extending longitudinally along a main line and having a section perpendicular to said main line, of which the largest dimension, referred to as "transverse dimension" G, is relatively small compared with the dimension referred to as "longitudinal dimension" L considered along said main line. What is meant by "relatively small" is that the ratio L/G is greater than or equal to 100, preferably greater than or equal to 1000. This definition covers both filamentary elements with a circular section and filamentary elements with a non-circular section, for example a polygonal or oblong section. Preferably, each filamentary element has a circular section.

The carcass ply 4 is preferably formed, in a way known per se, from a ply made of elastomeric material, preferably based on raw rubber, which is to say unvulcanized rubber, in which the carcass reinforcers 5 are embedded.

As a preference, said carcass reinforcers 5 extend lengthwise parallel to one another and each extends continuously from one lateral edge of said carcass ply 4 as far as the opposite lateral edge.

The carcass reinforcers 5 have a stiffness, which is to say a tensile strength modulus, which is strictly greater than the tensile modulus of the raw rubber of which the ply is made, and more generally greater than the tensile modulus of the vulcanized rubber, so as to make the carcass ply 4 almost inextensible in the direction of the length of said carcass reinforcers 5.

In this particular instance, the carcass reinforcers 5 may be formed of threads or cords made of any appropriate material, preferably a textile material or a metallic material.

In order to create the carcass entity 3, the tire-building zone 2 comprises a tire-building drum 6 which has a drum central axis X6 and which is mounted to rotate about said drum central axis X6.

Said drum 6 is thus supported by, and mounted in rotation on, a drum supporting structure 7, preferably extending cantilever-fashion from said drum supporting structure 7. Said drum supporting structure 7 preferably comprises a drive motor, preferably electric, able to drive the rotation of the drum 6 about its central axis X6.

As a preference, the tire-building drum 6 exhibits, at least initially when the carcass ply 4 is being laid, a receiving surface, which is preferably in the shape of a cylinder with a circular base, which forms a surface exhibiting symmetry of revolution about the drum central axis X6, and which is intended to accept the components of the carcass entity 3.

The tire-building zone 2 also comprises a first conveying system 10 which is designed to lay a carcass ply 4 on the tire-building drum 6 by winding it over said tire-building drum 6 about the drum central axis X6 so that the carcass reinforcers 5 exhibit, with respect to a circumferential direction C6 of the drum, a first angular orientation A5_1.

The first conveying system 10 may notably comprise a conveyor belt 13 extending transversely to the drum central axis X6 and ending facing said drum 6.

In practice, the drum central axis X6 coincides with the central axis of the carcass entity 3, which itself corresponds to the future axis of rotation of the wheel that will accept the tire produced from said carcass entity 3. For the convenience of the description, these various axes can therefore be assimilated to one another.

The expression "circumferential direction" and here, more specifically, the expression "circumferential direction C6 of the drum" means the direction which, at the point concerned, is substantially perpendicular both to the reference axial direction concerned, which is to say here perpendicular to the direction of the drum central axis X6, and perpendicular to a radius drawn perpendicularly from said reference axis to the point concerned, and thus here a radius of the drum 6 or, as appropriate, a radius of the carcass entity 3.

Thus, the circumferential direction C6 of the drum here corresponds to the imaginary curve, preferably a circle given the preferably circular cross section of the drum 6, that is such that said imaginary curve is defined by the intersection of the cylindrical receiving surface of the drum 6, which receives the constituent parts of the carcass entity 3, with a gauge plane normal to the drum central axis X6. The circumferential direction C6 thus, at every point considered on the circumference of the drum, corresponds to the orthoradial vector defining the tangent to said circumference of the drum at the point concerned, in said gauge plane.

As a preference, said gauge plane itself corresponds to the equatorial plane P_EQ of the tire and, more particularly, to the equatorial plane of the carcass entity 3, centered axially with respect to the carcass entity 2, and which thus subdivides said carcass entity 3 axially into two substantially symmetrical hemispheres of the same axial height, so that the circumferential direction C6 substantially coincides with the equatorial line of the carcass entity 3.

As a preference, the carcass reinforcers 5 extend initially, when the carcass ply 4 is being laid "flat" onto the drum 6 before shaping, in radial planes that contain the central axis X6 of the drum.

Figure 13:
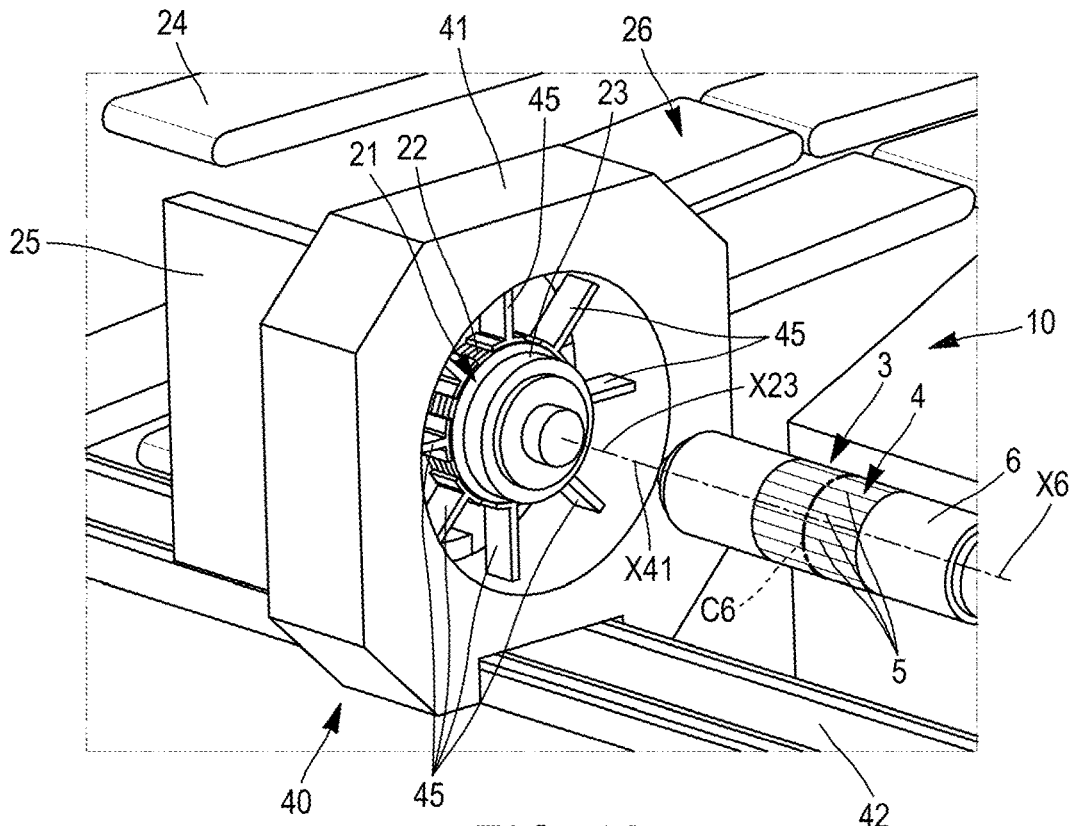
FIG. 13 illustrates, in a perspective view, the uptake, by the transfer ring, of the crown entity coming off the shell ring.
Figure 14:
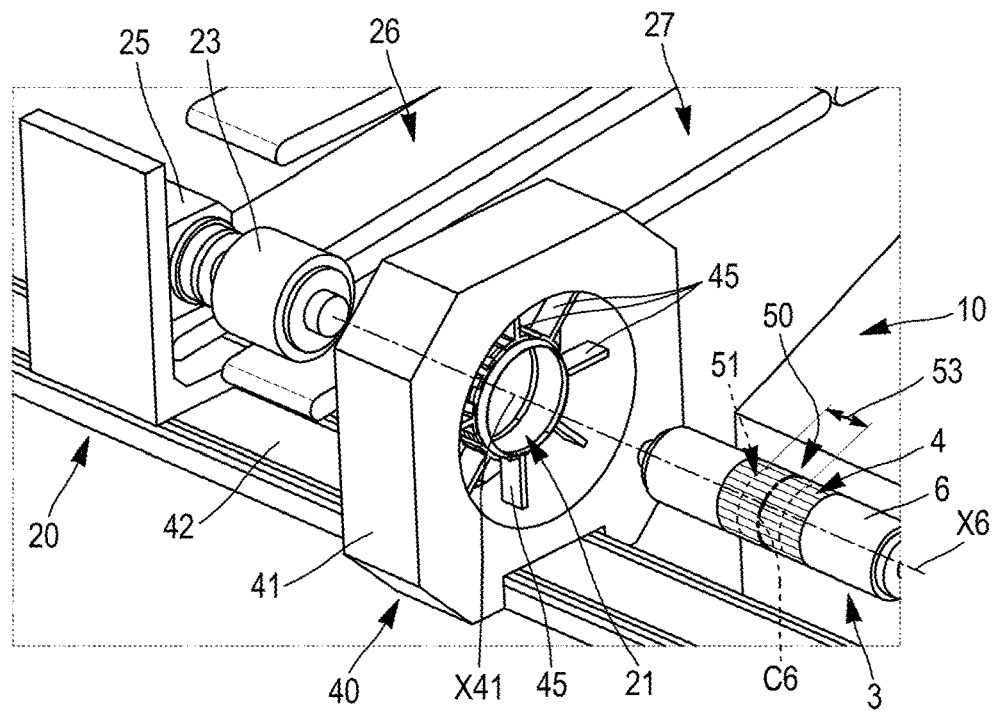
FIG. 14 illustrates, in a perspective view, the transfer ring holding the crown entity, taken from the shell ring, in a predetermined position in the assembling zone, awaiting the carcass entity.

Initially, after the carcass ply 4 has been laid on the drum 6, said carcass reinforcers 5 thus extend preferably parallel to the central axis X6, as is notably visible in FIGS. 13 and 14. The first angular orientation A5_1 in this case corresponds to a perpendicular orientation, the carcass reinforcers 5 effectively making an angle of 90 degrees (or substantially 90 degrees, for example of between 85 and 95 degrees) with respect to the circumferential direction C6.

Figure 18:
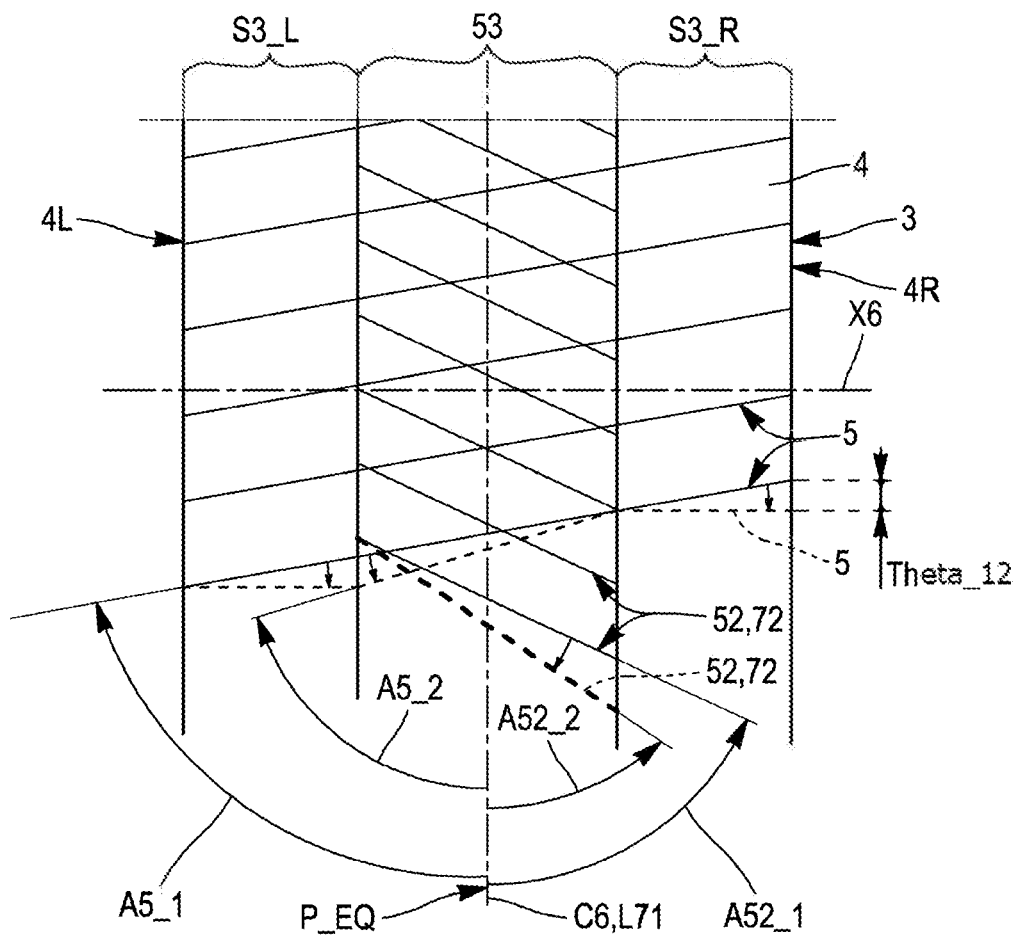
FIG. 18 illustrates, in a schematic view of a developed portion of the carcass entity according to the disclosure, the phenomena of reorientation of the reinforcers of the plies which occur during the shaping operation, showing, on the one hand, the effect of the biasing, which is the result of the mutual collaboration of the carcass reinforcers and of the biasing reinforcers and brings about, in the zone of overlap, a mutual reorientation of the carcass reinforcers and of the biasing reinforcers and, on the other hand, the radialization effect, which is to say the alignment of the carcass reinforcers on radial planes which occurs outside of the zone of overlap, in the sidewalls of the tire, under the effect of the radial expansion of the carcass entity.

Of course, it would be possible, without departing from the scope of the disclosure, to choose another first angular orientation A5_1, whereby the carcass reinforcers 5 were initially laid obliquely with respect to the circumferential direction C6, as is the case purely by way of illustrative example in FIG. 18, for example prior to shaping making an angle of between 27 and 150 degrees, preferably between 56 degrees and 123 degrees with respect to said circumferential direction C6.

Whatever the first angular orientation A5_1 adopted, the carcass reinforcers 5 extend parallel to one another and are each axially continuous, from a first selvage 4L which, with reference to the axial direction of the drum X6, forms one axial end of the carcass ply 4, as far as a second selvage 4R which forms the opposite axial end of said carcass ply 4.

What is meant by "continuous" is that each material of which the filamentary reinforcing element is made, and therefore more generally said filamentary reinforcing element, in this instance in particular each carcass reinforcer 5, extends uninterrupted, preferably as a single piece, over the entire length of said filamentary reinforcing element.

In that way, the carcass reinforcers 5 are able to connect two annular bead wires 11, 12 to one another. Said annular bead wires 11, 12, which are preferably made from braided metal wire, will be integrated into the carcass entity 3, concentrically with respect to the drum central axis X6, as is visible in FIG. 15, to allow the tire to be fitted later onto a wheel rim.

It will be noted that, as a preference, each of said bead wires 11, 12 will be added to the carcass entity 3 in the form of a subassembly referred to as a "bead entity" which comprises said bead wire 11, 12 as well as a ring of rubber, not depicted here, which is referred to as "bead apex" which has a substantially triangular cross section and the radially internal base of which is designed to press against or even surround the cross section of the bead wire 11, 12 in that region of the bead via which the tire presses against the rim.

The tire-building zone 2 and more preferably the first conveying system 10 will of course be designed to lay potential other components of the carcass entity 3 on the drum.

In particular, the first conveying system 10 will preferably allow a film known as an "inner liner", which is intended to make the tire airtight, to be wound onto the drum 6 prior to the laying of the carcass ply 4.

More particularly, the first conveying system 10 may be designed to lay and wind on the drum 6, about the central axis X6, a "complex" (not depicted), which is to say a subassembly which, in order to reduce the cycle time of the machine 1, will have been preassembled before being conveyed to the drum 6 and which will, for example, comprise the inner liner and two strips of rubber covering the lateral portions of said inner liner and which are intended to form the exterior sidewalls of the tire, and, possibly, cushions of gum known as "bead chafers" intended to reinforce the beads of the tire in the region of the bead wires 11, 12.

The carcass ply 4 will then be laid on the drum 6 over said complex.

As visible notably in FIGS. 1, 3 and 6, the machine 1 also comprises a second zone 20, referred to as "finishing zone" 20, designed to produce a second annular entity 21 that forms part of the tire, referred to as the "crown entity" 21, which comprises at least a tread 22.

Figure 12:
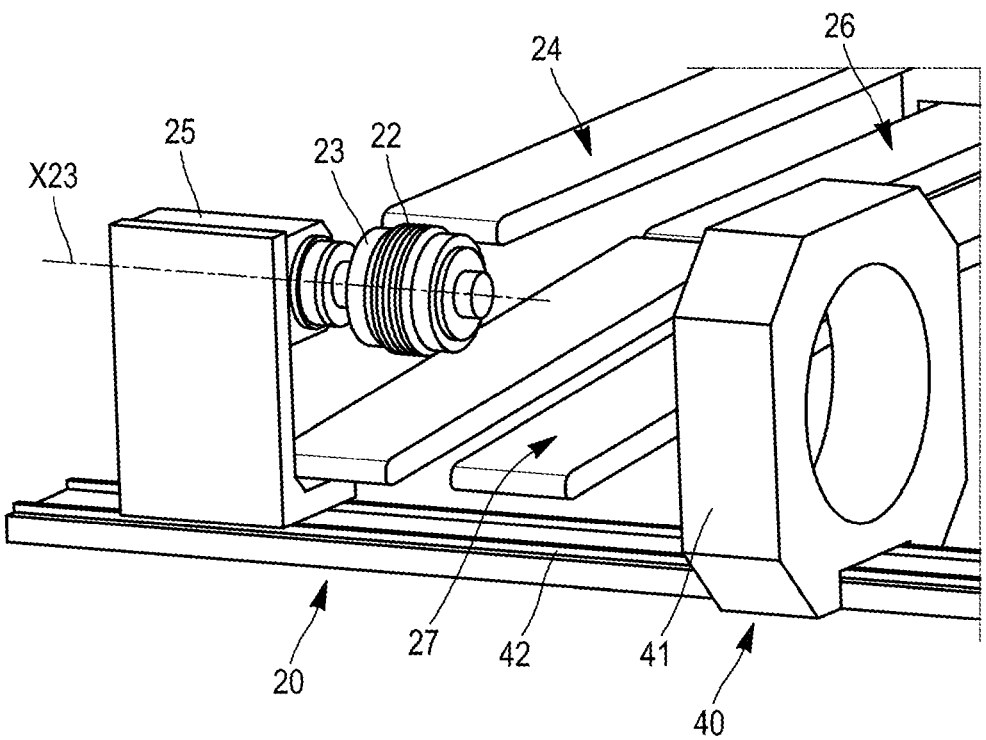
FIG. 12 illustrates, in a perspective view, the winding of a tread onto the shell ring in the finishing zone in order to form a crown entity.

Said finishing zone 20 for this purpose comprises a shell ring 23 mounted to rotate about a shell-ring central axis X23, and a second conveying system 24 for laying the tread 22 by winding on the shell ring 23 about the shell-ring central axis X23, as illustrated in FIG. 12.

The shell ring 23 is supported, preferably cantilever-fashion, by a shell-ring supporting structure 25 capable of driving said shell ring 23 in rotation about the central axis X23 thereof. Said shell-ring supporting structure 25 is for this purpose provided with a drive motor, preferably an electric motor.

The shell ring 23 will preferably have a receiving surface that exhibits a shape exhibiting symmetry of revolution about the shell-ring central axis X23, for example the shape of a cylinder with a circular base or else a toroidal bulging (convex) shape, said receiving surface being intended to accept the components of the crown entity 21.

As a preference, notably for the sake of compactness, the shell-ring central axis X23 will be parallel to the drum central axis X6.

More generally, the common direction, parallel to these two central axes X6, X23, will, by convention, define an overall axial direction of the machine 1.

Of course, the finishing zone 20 will, if need be, comprise the devices 26, 27 needed for laying, by winding, on the shell ring 23 the various other constituent components that make up the crown entity 21.

In particular, the finishing zone 20 may comprise a winding-on device designed to lay a hooping belt on the shell ring 23, before the tread 22 is laid and therefore radially beneath said tread 22, said belt being obtained by winding a continuous reinforced strip in a helix about the shell-ring central axis X23, for several contiguous consecutive turns.

The reinforced strip used to create the hooping belt will contain continuous hoop reinforcers, which extend parallel to one another and parallel to the longitudinal direction of said reinforced strip so that, ultimately, said hoop reinforcers end up in the crown entity 21 and, more generally, in the tire, oriented with respect to the circumferential direction C6 at an angle that corresponds to the helix angle of the turns of said hooping belt, which angle is relatively small, for example less than or equal to 5 degrees, so that said reinforcers extend substantially in the circumferential direction.

In practice, the placing of the hooping belt within the finishing zone 20 will be performed by selecting, during the winding-on, a helix angle which will preferably be less than or equal to 10 degrees, preferably less than or equal to 7 degrees, and more preferably less than or equal to 5 degrees.

The finishing-zone devices 26, 27 may have need to comprise several conveying systems, as visible notably in FIG. 1, 2, 3, 6 or 7, each conveying system being capable of conveying at least one of the constituent components of the crown entity 21 as far as the shell ring 23.

As visible in the aforementioned figures, the devices, notably the conveying systems 24, 26, 27, may be staged axially and/or vertically in the finishing zone 20 in order to keep the overall unit nice and compact.

The shell-ring supporting structure 25 may therefore be provided with a movement mechanism allowing it to move horizontally (along the shell-ring axis X23) and/or vertically so that said shell-ring supporting structure 25 can present the shell ring 23 successively to face the various devices and conveying systems 24, 26, 27 so as to collect the various constituent components of the crown entity 21 in the desired order.

Figure 16:
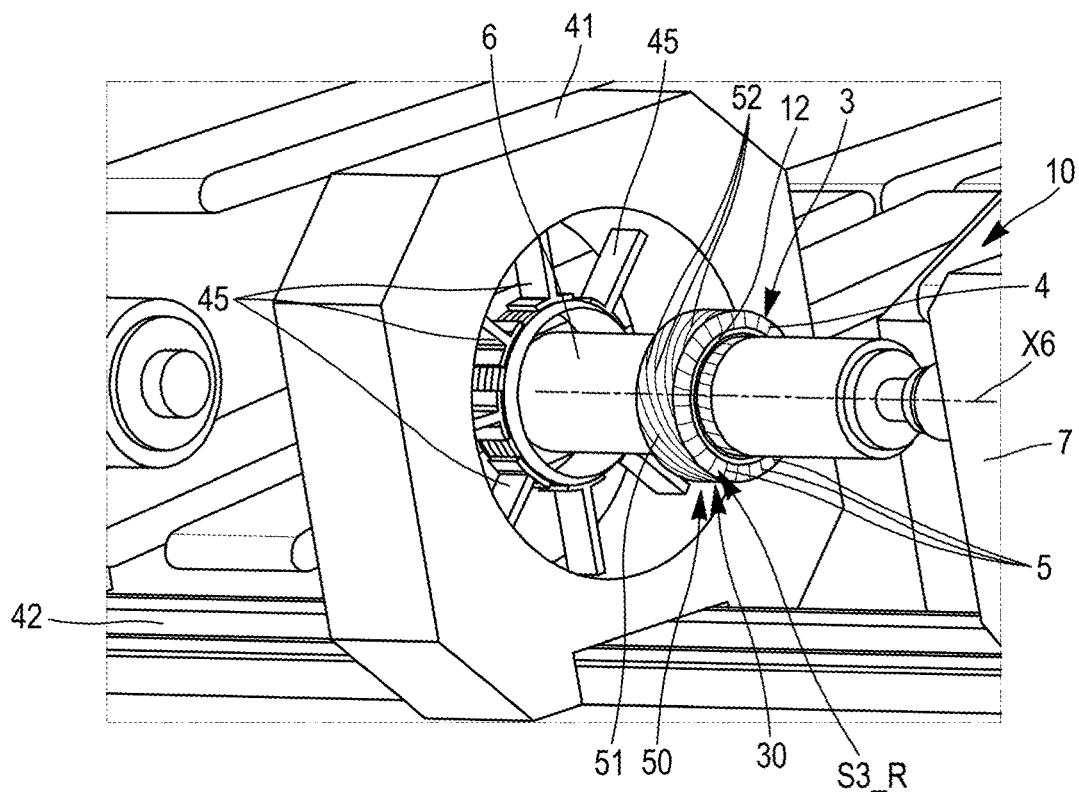
FIG. 16 illustrates, in a perspective view, the drum performing the operation of shaping the carcass entity, accompanied where appropriate by a simultaneous operation of biasing said carcass entity.

The machine 1 further comprises a shaping system 30 designed to perform a shaping operation which causes the carcass entity 3 present on the tire-building drum 6 to expand radially in order to obtain what is referred to as a "shaped" carcass entity 3 of toroidal shape, as visible in FIG. 16.

For the sake of better clarity of the figures, the shaping system 30, which is known per se, is not depicted in detail.

Such a shaping system 30 essentially allows the first bead wire 11 and the second bead wire 12 to be brought axially closer to one another, while at the same time, in a movement of centrifugal radial expansion with respect to the central axis X6, pushing the axially central part of the carcass entity 3 radially outward so as to give said carcass entity 3 a bulging toroidal shape which is similar to, or even coincides with, the definitive shape of the tire. This then also causes circumferential expansion of the carcass entity 3 in the circumferential direction C6.

More particularly, said shaping system 30 will allow the carcass entity 3 to pass from a contracted configuration, preferably cylindrical with a circular base, which corresponds to the "laid flat" configuration in which the inner liner and the carcass ply 4 are initially laid by being wound onto the drum 6, to a deployed configuration in which said carcass entity 3 exhibits a toroidal shape, bulging radially outwards, which preferably corresponds substantially to the shape that said carcass entity 3 will adopt in the finished tire.

As a preference, the shaping system 30 operates by inflation, so as to cause the carcass entity 3 to expand by blowing into the airtight cavity delimited by the wall formed by the constituent layers of the carcass entity 3, and more particularly by the wall formed by the inner liner, a gas, for example air, at a predetermined pressure referred to as the "shaping pressure" which is higher than the ambient atmospheric pressure.

Once the carcass entity 3 has been shaped, a ply-turning operation is preferably performed, which operation consists in turning the lateral portions of the carcass ply 4, which project axially beyond the bead wires and the strips that form the exterior sidewalls, back over the bead wires 11, 12 and more generally over the bead entities, against the lateral portions of the shaped carcass entity 3.

Figure 17:
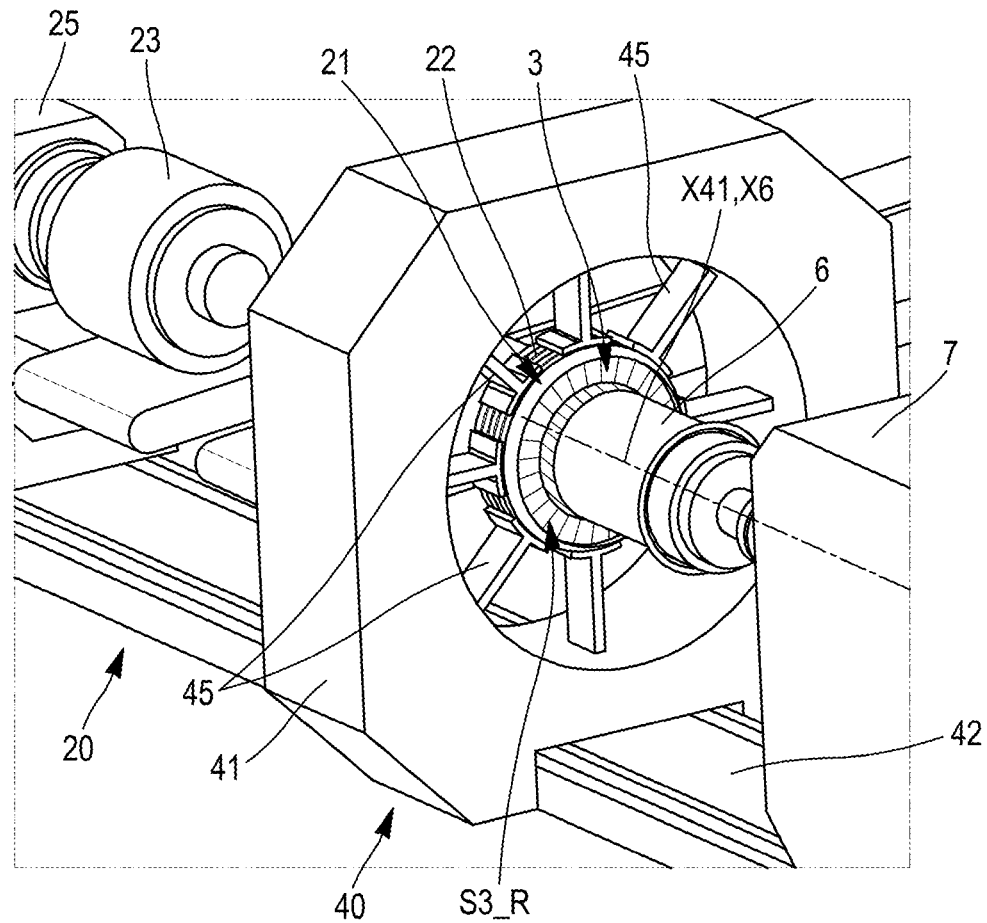
FIG. 17 illustrates, in a perspective view, the transfer ring proceeding, in the assembling zone, to assemble the crown entity on the carcass entity while said carcass entity is being held in the shaped and, where appropriate, biased configuration by the drum.

The machine 1 also comprises a third zone 40 referred to as "assembling zone" 40, which is designed to assemble the crown entity 21 concentrically on the shaped carcass entity 3, as illustrated in FIG. 17, in order to obtain a tire.

In order to perform this assembling, the crown entity 21, closed onto itself in a ring during the manufacture thereof on the shell ring 23, is slipped axially along and around the drum 6 bearing the carcass entity 3.

To make it easier to engage the crown entity 21 around the carcass entity 3, it is possible to partially contract the carcass entity 3 radially, with respect to the fully shaped configuration which corresponds to maximum radial expansion.

This partial contraction allows the carcass entity 3 to maintain a toroidal shape, in a configuration of intermediate expansion in which said carcass entity 3 has an overall radius of an intermediate value strictly comprised between, on the one hand, the drum base radius which corresponds to the contracted "laid flat" configuration of the laying of the carcass ply 4 and, on the other hand, a maximum radius which corresponds to the deployed shaping configuration in which the carcass entity 3 is fully expanded.

This partial contraction can be obtained by slightly relieving the inflation pressure applied by the shaping system 30 in order to bring the inflation pressure to a level that is intermediate between the ambient atmospheric pressure and the shaping pressure, said intermediate level being referred to as the "introduction pressure", and by (slightly) increasing the distance axially separating the two bead wires 11, 12 from one another.

Once the crown entity 21 has been engaged and superposed on the carcass entity 3, a rolling operation using a fudging wheel can be performed in order to press said crown entity 21 substantially radially onto the carcass entity 3 to ensure good cohesion between the two entities 21, 3, particularly at the shoulders of the tire, where the lateral ends (wings) of the tread 22 are made to conform to the sidewalls of the carcass entity 3.

Likewise, another rolling operation, this time applying a mainly axial pressure, ensures good cohesion, at the sidewalls, of the flaps of the carcass ply 4 which are formed over the bead wires 11, 12 during the ply-turning operation mentioned above.

It will be noted in this respect that it is possible to opt either for a method variant whereby the carcass ply 4 is turned over the bead wires 11, 12, by rolling the sidewalls, in the tire-building zone 2, before subsequently laying the crown entity 21, so that the axial ends of said crown entity, and more particularly the axial ends of the tread 22 that form the shoulders of the tire, are laid over sidewalls that have already been rolled, or for another method variant whereby, this time, the sidewall portions (at least in their part radially farthest from the drum axis X6) are left open while the carcass entity 3 is being produced, and then the crown entity 21 is laid on the carcass entity 3 and it is only then that said sidewalls are turned, while rolling them, over the axial ends of the tread 22.

In any event, once the (raw, green) tire has been thus formed, said tire is removed from the drum, for example by means of a robotic removal arm (not depicted) then taken to a curing press where it is vulcanized.

In order to perform assembling, the assembling zone 40 comprises a transfer device 41 of the transfer-ring type 41, which is designed to receive the crown entity 21 coming from the shell ring 23 of the finishing zone 20, as illustrated in FIG. 13, and transfer said crown entity 21 onto and around the shaped carcass entity 3, as illustrated successively in FIGS. 14 and 17.

The transfer device 41 is preferably formed of a transfer ring 41 and may thus be likened to such a transfer ring 41 in what follows.

Said transfer ring 41 is advantageously coaxial with the tire-building drum 6 so that the drum 6 supporting the carcass entity 3 can slide inside said transfer ring 41 supporting the crown entity 21, through a movement of axial translation toward one another, in a direction that is parallel, and preferably co-linear, with the central axis X6 of the drum 6.

As illustrated in FIGS. 13, 14 and 17, the transfer ring 41 preferably takes hold of the crown entity 21 from the outside, engaging with the radially external surface of the tread 22, preferably at a number of angular sectors which, in order to ensure a balanced and stable grip, are preferably distributed over at least 180 degrees, at least 270 degrees or even over 360 degrees about the central axis X41 of said transfer ring 41.

In absolute terms, it might be conceivable for the transfer ring 41 for example to take hold of the crown entity 21 using a system of suction cups.

However, as a preference, and as visible in FIGS. 13, 14 and 16, the transfer ring 41 will take hold of the crown entity 21 by means of a plurality of jaws 45, which are mounted radially mobile and distributed in the azimuth direction, substantially in a star shape, about the central axis X41 of said transfer ring so as to be able simultaneously to move out centripetally to press against the crown entity 21 in distinct and substantially concurrent directions. Thus, the crown entity 21 may be held in the transfer ring 41 mechanically, by constriction, by making use of the intrinsic stiffness of the closed annular structure of said crown entity 21.

As a preference, in order to allow the transfer ring 41 to detach the crown entity 21 from the shell ring 23, the shell-ring supporting structure 25 moves the shell ring 23 axially closer to and slides same into the transfer ring 41 of which the central axis X41 is then preferably coincident with the central axis X23 of said shell ring, as visible in FIG. 13.

Once the crown entity 21 has been taken up by the transfer ring 41, the shell ring 23 is disengaged axially through a retreating axial movement of the shell-ring supporting structure 25, as illustrated in FIG. 14.

The drum supporting structure 7 can then be moved to engage the drum 6 axially in the transfer ring 41, preferably via the opposite side from the side used to engage the shell ring 23, so that the transfer ring 41 can apply the crown entity 21 in radial superposition on, and all around, the carcass entity 3, as illustrated in FIG. 17. The central axis X41 of the transfer ring 41 is then preferably coincident with the central axis X6 of the drum.

It will be noted that the projecting cantilevered arrangement of the shell ring 23, in this instance projecting axially, with respect to the shell-ring supporting structure 25, and also the projecting cantilevered arrangement of the drum 6, in this instance projecting axially, with respect to the drum supporting structure 7, facilitates the alternating introduction of the shell ring 23 and then, respectively, of the drum 6 into the transfer ring 41.

In absolute terms, it might be conceivable for the transfer ring 41 itself to be mobile, notably in axial translation, guided parallel to the respective central axes X23 of the shell ring and X6 of the drum, so as to be able to perform at least part of the movement necessary for the transfer from the shell ring 23 to the drum 6, and more particularly for transferring the crown entity 21 axially from the finishing zone 20 as far as the assembling zone 40.

However, as a particular preference, the transfer ring 41 will be stationary, so as to occupy a predetermined fixed position in the assembling zone 40 with respect to the frame of reference in which the machine 1 is installed (typically the floor of the building), whereas the mobile elements will be the shell-ring supporting structure 25 and, respectively, the drum supporting structure 7 and it will be these elements that will perform the necessary movements, in this instance more particularly the necessary axial movements, with respect to the installation frame of reference and, therefore, with respect to the transfer ring 41 in order to be positioned alternately in said transfer ring 41, moving in, respectively, from the finishing zone 20 and from the tire-building zone 2.

Advantageously, the use of a fixed transfer ring 41, preferably placed in a substantially central position with respect to the drum 6 and to the shell ring 23, will allow the easy, reliable and repeatable adoption of a machine origin with respect to the transfer ring 41, thus making it possible to use a common frame of reference for performing the various movements of the drum supporting structure 7 and of the shell-ring supporting structure 25.

According to a preferred arrangement of the machine 1 which is notably applicable regardless of whether the transfer ring 41 is fixed or mobile, the tire-building drum 6, and more particularly here the drum supporting structure 7, the transfer device 41, in this instance the transfer ring 41, and the shell ring 23, and more particularly here the shell-ring supporting structure 25, are aligned in this order along the one same, preferably rectilinear, main guide rail 42 so that the shell ring 23, and more particularly here the shell-ring supporting structure 25, can move back and forth along said main guide rail 42 from the finishing zone 20 as far as the assembling zone 40 in order to set down the crown entity 21 in the transfer device 41, whereas the tire-building drum 6, and more particularly here the drum supporting structure 7, can move back and forth from the tire-building zone 2 as far as the assembling zone 40 to present the shaped carcass entity 3, in the transfer device 41, to axially face the crown entity 21 contained in said transfer device 41.

Such an arrangement advantageously allows the assembling zone 40, and the transfer device 41, to be placed in a central position, while the operations of, on the one hand, tire-building, which is to say the manufacture of the carcass entity 3, and, on the other hand, finishing, which is to say the manufacture of the crown entity 21, are distributed in the "wings" of the machine 1, on either side of the assembling zone 40, in, respectively, a tire-building first zone 2 situated axially, along the main guide rail 42, on a first side of the assembling zone 40 and of the transfer device 41 and in a finishing second zone 20 situated axially on a second side of the assembling zone 40 and of the transfer device 41, which is the opposite side to the first side.

Such a spatial distribution, which is well balanced, on the one hand allows the tasks involved in the manufacture of the various entities 3, 21 that make up the tire to be distributed, thus reducing the cycle time by performing certain tasks in parallel, as will be explained later, and on the other hand makes it possible to limit the amplitude of the movements of the drum supporting structure 7 and shell-ring supporting structure 25, thereby saving time and energy.

Furthermore, having the tyre-building zone 2, assembling zone 40 and finishing zone 20 aligned (in that order) in a common direction embodied by the main guide rail 42 advantageously allows a rational and compact layout of the machine 1 to be performed, in which the conveying systems 10, 24, 26, 27, 70 tasked with supplying the components needed for the manufacture of the carcass entity 3 and crown entity 21 may advantageously extend, as is visible in FIGS. 1, 3 and 6, transversely to the direction of the main guide rail 42 and more preferably perpendicular to the direction of the main guide rail 42, preferably in directions parallel to the horizontal.

This advantageously simplifies the operations of conveying supplies to and performing maintenance on the machine 1.

As a preference, the direction of the guide rail 42 is parallel to the drum central axis X6, and more generally to the central axis X23 of the shell ring and to the central axis X41 of the transfer ring, and thus embodies the (overall) axial direction of the machine 1.

According to the disclosure, the machine 1 comprises a biasing system 50 which is designed to bring into contact with the carcass entity 3, before the shaping operation, an annular structure known as a "biasing structure" 51, which is centered on the drum central axis X6 and provided with a second set of filamentary reinforcing elements 52, referred to as "biasing reinforcers" 52, which, with respect to the circumferential direction C6 of the drum, have a second angular orientation A52_1 which is different from the first angular orientation A5_1 of the carcass reinforcers 5.

Said biasing structure 51 thus conveyed and positioned by the biasing system 50 extends in such a way as to partially straddle the carcass ply 4 along the drum central axis X6, in a zone referred to as "zone of overlap" 53, so that during the shaping operation, the biasing reinforcers 52 interact with the carcass reinforcers 5 in order to modify, in the zone of overlap 53, the angular orientation of said carcass reinforcers 5 with respect to the drum circumferential direction C6 so as thus to obtain a carcass entity 3 that is shaped and biased.

As is notably visible in FIG. 2, 5, 11, 15 or 18, the biasing reinforcers 52 preferably run mutually parallel and preferably continuously from one axial end of the zone of overlap 53 to the other axial end thereof, and more generally from one axial end of the biasing structure 51 to the other.

What is meant by "biased" is an object or a structure, in this instance the carcass ply 4 and more generally the carcass entity 3 in its entirety, which results from a biasing operation within the meaning of the disclosure.

As indicated in the introductory part of the present application and recalled hereinabove, a "biasing" operation consists in causing part of a carcass ply containing filamentary reinforcing elements referred to as "carcass reinforcers" to straddle a biasing structure 52 containing biasing reinforcers 52, so that said reinforcers cross one another and can thus interact in order to mutually reorientate one another under the effect of the shaping.

Of course, the carcass ply 4 and the biasing structure 51 will be connected to one another securely enough, at least before and during the shaping operation, that they do not slide freely relative to one another and that their respective reinforcers 5, 52 can thus interact, in the manner of the meshes (in this instance parallelepipedal meshes) of a meshed network, of which the nodes correspond to the virtual crossovers of said reinforcers 5, 52 (considered in projection onto the surface of the zone of overlap 53).

In practice, and as is notably visible in FIG. 18, the zone of overlap 53 corresponds to a central portion of the carcass ply 4, which is situated at some distance from each of the axial ends 4L, 4R of said carcass ply 4 and which is intended to be situated beneath the tread 22, between the shoulders of the tyre.

The lateral portions of the carcass ply 4, which are not covered by the biasing structure 51 and are therefore situated outside of the zone of overlap 53, are advantageously intended to form the left S3_L and right S3_R sidewalls of the carcass entity 3 and more generally of the tire. Said sidewalls correspond, as is known per se, to those portions of the carcass entity 3 and more generally of the tire that are intended to rise up substantially radially during the shaping operation so that each connects a bead wire 11, 12 to the nearest shoulder, at the corresponding axial end of the tread 22.

Thus, while the biasing operation causes the carcass reinforcers 5 situated on the expanded cylindrical surface of the carcass entity 3 to rotate in terms of yaw (in an imaginary plane that is ortho-radial with respect to the drum axis X6, and therefore tangential to the circumferential direction C6 at the point concerned), thus modifying the angular orientation of said carcass reinforcers 5 with respect to the circumferential direction C6, as illustrated in dotted line in FIG. 18, so as to confer upon said carcass reinforcers 5 a third angular orientation A5_2, distinct from the first angular orientation A5_1, said biasing operation by contrast has little or no effect on the edges of the carcass ply 4 that form the sidewalls S3_L, S3_R, and that are not covered by the biasing structure 51 and are thus situated outside of the zone of overlap 53.

Similarly, at the same time and reciprocally, the action of the carcass reinforcers 5 on the biasing reinforcers 52 during the shaping operation reorientates said biasing reinforcers to cause them to pass from the second angular orientation A52_1 to a fourth angular orientation A52_2 different from said second angular orientation A52_1, as is illustrated in FIG. 18.

Incidentally, it will be noted that, in the sidewall portions S3_L, S3_R, outside of the zone of overlap 53, the shaping operation has a tendency to "radialize" the carcass reinforcers 5, namely to substantially align said carcass reinforcers 5 on radial planes containing the drum axis X6, if indeed, moreover, said carcass reinforcers 5 were not already initially positioned parallel to said drum axis X6 during the laying of the carcass ply 4.

Thus, if the carcass reinforcers 5 were initially parallel to the drum axis X6 (A5_1=90 degrees), said reinforcers will then substantially, during the shaping operation, maintain their initial orientation in radial planes containing the drum central axis X6.

Conversely, if the carcass reinforcers 5 are initially laid at an angle to the drum central axis X6, then the shaping operation has a tendency to realign them on radial planes, as is illustrated in FIG. 16 and FIG. 18.

As a preference, in order to allow the drum 6 to accompany the relative azimuthal rotation Theta_12 of the bead wires 11, 12, referred to as the "twisting rotation", Theta_12 generally in practice being of the order of 5 degrees to 10 degrees, which occurs during the shaping of the carcass entity 3 and the radialization of the carcass reinforcers 5 in the sidewalls, as is visible in FIG. 18, the first bead wire 11 may be supported by a first cradle of the drum 6 and the second bead wire by a second cradle of the same drum 6, mounted with the freedom to rotate with respect to the first cradle about the drum axis X6.

In any event, the biasing, located in the zone of overlap 53, as performed in accordance with the disclosure, allows the carcass entity 3, and therefore more generally the tire, to adopt an architecture whereby the reinforcers under the crown of the tire are biased, while at the same time maintaining an architecture whereby the reinforcers in the sidewalls are radial.

According to the disclosure, the machine comprises an automatic control unit 60, for example an electronic control unit 60, which comprises at least a program enabling automatic execution by the machine 1 of a cycle known as a "biased-crown tire manufacturing cycle" which comprises a step (a) of producing a crown entity 21 in the finishing zone 20, a step (b) of preparing a shaped and biased carcass entity 3 which step comprises a sub-step (b1) of creating a carcass entity 3 in the tire-building zone 2 and then a shaping and biasing sub-step (b2) during which said carcass entity 3 coming from the tire-building zone 2 is shaped and biased in order to obtain a shaped and biased carcass entity 3, said cycle making provision for the step (a) of producing the crown entity 21 to overlap in time with at least part of the step (b) of preparing the carcass entity 3 so that at least part of the production of the crown entity 21 is performed in parallel with the preparation of the carcass entity 3, and then finally an assembling step (c) during which, in the assembling zone 40, the transfer device 41 places and fixes the crown entity 21 on the shaped and biased carcass entity 3 so as to obtain a tire, in this instance a tire having a biased-crown architecture.

More preferably, the control unit 60 is programmed in such a way that step (a) of producing the crown entity 21, which takes place in the finishing zone 20 and during which said crown entity 21 is manufactured by laying the component or components of said crown entity 21, which include the tread 22, on the shell ring 23, overlaps in time with at least part of sub-step (b1) of creating the carcass entity 3, which takes place in the tire-building zone 2, and during which said carcass entity 3 is manufactured, in this instance preferably "laid flat", by laying the components of said carcass entity 3, including the carcass ply 4, on the drum 6.

Advantageously, the use of a control unit 60 which automatically provides centralized and synchronized management of the various zones 2, 20, 40 and the various systems 6, 7, 10, 23, 25, 24, 30, 41, 50 of the same machine 1, makes it possible to optimize the execution of the aforementioned steps, particularly making it possible to perform simultaneously, at least in part, on the one hand, the preparation of a carcass entity 3 and, on the other hand, the manufacture of a crown entity 21 which is intended to incorporate the same tire as said carcass entity 3.

More particularly, the machine 1 may thus automatically manufacture a crown entity 21 in the finishing zone 20 and place said crown entity 21 on standby in the transfer ring 41 while moreover, at least in part during the same space of time, it manufactures then shapes and biases on the drum 6 a carcass entity 3 which it then, with the drum 6, slips inside the transfer ring 41 so that said carcass entity 3 receives said crown entity 21 on the radially external surface of said carcass entity.

It will be noted that the preparation of a shaped and biased carcass entity 3, in the tire-building zone 2, may in practice take longer than the creation of the corresponding crown entity 21 in the finishing zone 20 which means that it is generally the crown entity 21 that is completed first and placed on standby in the transfer ring 41 awaiting the end of the process of manufacturing, shaping and biasing the carcass entity 3.

In any event, the automatic sequencing of the aforementioned steps will allow automatic production of a tire during the course of a cycle and then, as soon as said tire has been removed for curing, will allow the same cycle to recommence in order to automatically produce a second tire, and so on.

Thus, as many tires as desired can be produced sequentially, unit after unit, and advantageously with no waste of material since the components prepared and conveyed into the machine 1 are immediately and fully used by being incorporated into their respective entity 3, 21 and, more generally, into the tire effectively manufactured during the course of the cycle concerned.

Moreover, whatever variant is considered, the machine 1 preferably, as visible notably in FIGS. 1, 3 and 6, comprises a third conveying system 70 which is designed to convey a ply referred to as "crown ply" 71, which crown ply 71 is intended to integrate the tire between the carcass ply 4 and the tread 22 in order to reinforce said tire.

Figure 15:
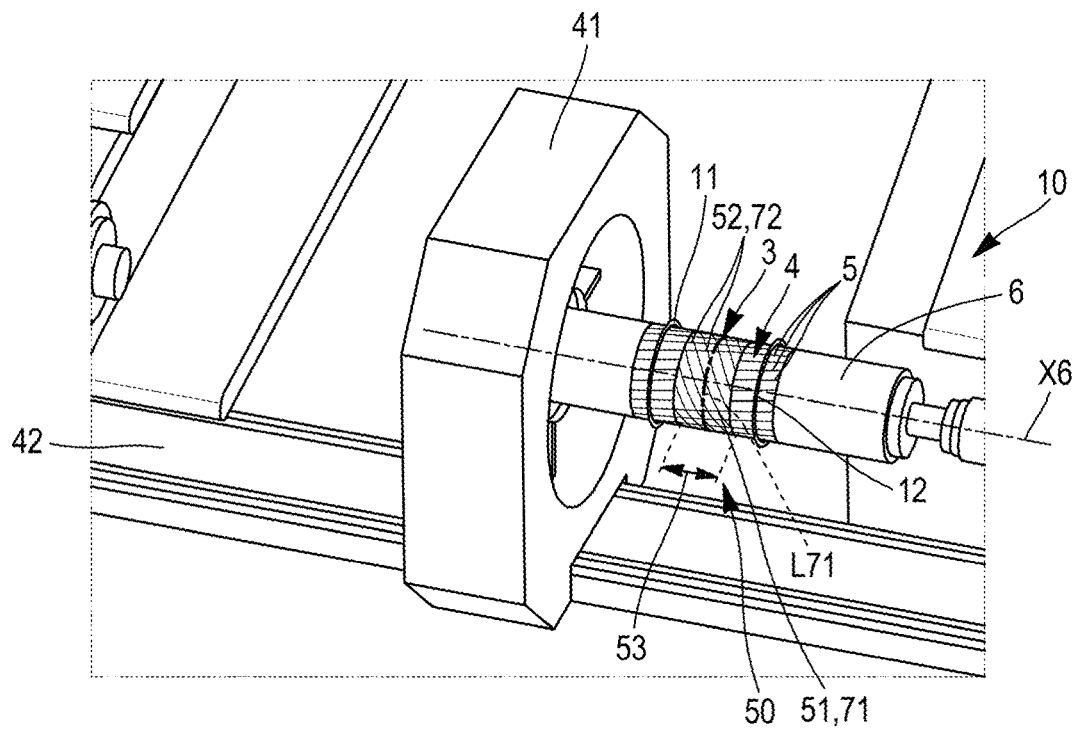
FIG. 15 illustrates, in a perspective view, the laying of bead wires on the carcass entity present on the tire-building drum.

In order to perform its reinforcing function, said crown ply 71 comprises a layer of elastomeric material which extends in a longitudinal direction L71 from a head end 71F as far as a tail end 71R and in which there are filamentary reinforcing elements 72, referred to as "crown ply reinforcers" 72, which are arranged parallel to one another at a predetermined angle referred to as the "crown ply angle" with respect to the longitudinal direction L71, as is notably visible in FIGS. 1 and 15.

Said crown ply reinforcers 72 each extend continuously from one lateral edge of the crown ply 71 to the axially opposite lateral edge of said crown ply 71.

As a preference, the longitudinal ends 71F, 71R of the crown ply 71 are mitred, with the direction of cut corresponding to the oblique direction of the crown ply angle, so that the edges of said mitres run parallel to the crown ply reinforcers 72.

As explained above, the crown ply reinforcers 72 are superposed on, crossing over with, the carcass ply reinforcers 5 and, where appropriate, with a third family of reinforcers which are contained in a hooping belt (not depicted) hooping the crown entity 21 and oriented substantially in the circumferential direction C6, so that these three types of superposed and crossed reinforcers together overall form a triangular reinforcing structure.

As a preference, the crown ply reinforcers 72 are formed of metal threads or cords based on metal threads.

According to a first possible implementation of the disclosure, the biasing system 50 may use, as biasing structure 51, a biasing sleeve which contains the biasing reinforcers 52 and which forms an integral part of the tire-building drum 6 on which the carcass ply 4 is set down so that said biasing sleeve can act as a reusable biasing structure 51 which interacts temporarily with the carcass entity 3 when the tire-building drum 6 is being radially expanded in order to perform the shaping operation, and is then separated from the tire when said tire is removed from the tire-building drum 6.

In such instances, the crown ply 71 will preferably be integrated into the crown entity 21 rather than into the carcass entity 3, so as not to interfere with the action of the biasing sleeve 51 of the drum 6 when said drum 6 is being expanded in order to shape and bias the carcass ply 4 in the zone of overlap 53.

In this way, the crown ply 71 will be initially integrated into the crown entity 21 and then finally laid on the carcass ply 4 and the carcass entity 3 at the same time as the rest of the crown entity 21, after said carcass entity 3 has been shaped and biased.

Such a method of biasing using a reusable sleeve has notably formed the subject matter of patent FR-2 797 213 filed by the Applicant Company.

The reusable-sleeve biasing system 50 may for example correspond to FIG. 14 if it is considered that, in this FIG. 14, the lines drawn in dotted line of the biasing structure 51 here correspond to the axial limits of an underlying biasing sleeve enveloping the expandable surface of the drum 6 under the zone of overlap 53 of the carcass ply 4. Such a biasing sleeve would preferably take the form of a tubular elastic membrane, fitted over the drum 6 and in which the biasing reinforcers 52 are located.

According to a second possible implementation of the disclosure, which may be preferred over the preceding possibility, the biasing system 50 this time uses the crown ply 71 itself as a biasing structure 51 so that the crown ply reinforcers 72 form the biasing reinforcers 52.

The third conveying system 70 will then be arranged for this purpose in order to convey the crown ply 71 into the tire-building zone 2 and wind said crown ply 71 onto the tire-building drum 6 until the tail end 71R of said crown ply 71 closes onto the head end 71F of this same crown ply 71 so as to integrate said crown ply 71 into the carcass entity 3 before the shaping operation.

Advantageously, the biased portion of the carcass ply 4 under the crown of the tire in the zone of overlap 53 may take the place of one of the crown plies required, since the carcass reinforcers 5 thus oriented obliquely with respect to the circumferential direction C6 may be superposed and criss-cross with the reinforcers 72 of the crown ply 71 on the one hand, and with the circumferential reinforcers of the hooping belt on the other hand, to form triangular reinforcing structures. Thus, advantageously, it will be possible to form the tire using just one single crown ply 71 rather than two crown plies.

As a preference, during the laying and winding of the crown ply 71 on the drum 6, during which operations said crown ply 71 closes up in a ring on itself, on top of the carcass ply 4, the longitudinal direction L71 of said crown ply 71 coincides with the circumferential direction C6 of the drum 6 and of the carcass entity 3.

Thus, the ply angle formed by the crown ply reinforcers 72 with respect to the longitudinal direction L71 of the crown ply coincides with the angular orientation, and more particularly with the second angular orientation A52_1, of the biasing reinforcers 52.

In practice, according to this second possible implementation, the zone of overlap 53 corresponds to that portion of the carcass ply 4 that is covered by the crown ply 71, and therefore in practice coincides with the (complete) surface extent of said crown ply 71, whereas the sidewalls S3_L, S3_R of the carcass entity 3, which sidewalls will not be subjected to the biasing phenomenon, correspond to those portions of the carcass ply 4 that are not covered by the crown ply 71 and initially, on the cylindrical surface of the drum 6, form annular strips projecting out axially on each side from said crown ply 71.

Unlike in the first possible implementation which called for a reusable biasing sleeve, the second possible implementation uses by way of biasing structure the crown ply 71 itself, which is thus integrated into the carcass entity 3 before shaping so that its reinforcers 72 interact with the carcass reinforcers 5 to bring about biasing, and which therefore finds itself permanently integrated into the tire, as a structural element of said tire, and more particularly as a structural element of the carcass entity 3.

In other words, the method according to this second possible implementation amounts to permanently integrating the biasing structure 51 into the tire, which biasing structure is thus consumed on each biased-crown tire manufacturing cycle.

It will be noted that it is possible to conceive of a plurality of variants of machine 1 capable of using the crown ply 71 as a biasing structure 51.

In particular, it is possible to conceive of variants (FIGS. 1 and 3) in which the crown ply 71 is conveyed directly into the tire-building zone 2 by a third conveying system 70 which is fully and exclusively situated on the same side as the tire-building zone 2, with respect to the assembling zone 40 and the transfer device 41 thereof, along the guide rail 72, or else on the other hand variants (FIG. 6) in which said third conveying system 70 extends also at least in part on the same side as the finishing zone 20 and allows the crown ply 71 to branch off toward the tire-building zone 2, when necessary, by crossing the imaginary vertical plane referred to as the "plane of separation" which is normal to the guide rail 42 (and more generally which is normal to the central axis X6 of the drum 6 and/or to the central axis X23 of the shell ring 23) and which passes through the assembling zone 40 and/or through the transfer ring 41, preferably through the axial middle of said assembling zone 40 and/or through the axial middle of the transfer ring 41.

According to a first embodiment variant illustrated in FIGS. 1 and 2, the third conveying system 70, tasked with conveying the crown ply as far as the tire-building zone 2, may be superposed with the first conveying system 10 tasked with conveying the carcass ply 4, so that the drum 6 is able to receive the carcass ply 4 and then the crown ply 71 successively without the need to modify the axial position of said drum 6 along the drum central axis X6.

More particularly, as visible in FIGS. 1 and 2, the first and third conveying system 10, 70 may notably respectively comprise a first conveyor belt 13 conveying the carcass ply 4 and, where appropriate, able also to convey the complex comprising the inner liner and the outer sidewalls, and a second conveyor belt 73 tasked with conveying the crown ply 71 and which are arranged in such a way that each of said first and second conveyor belts 13, 73 ends in the tire-building zone 2 facing the drum 6.

The two conveyor belts 13, 73 will preferably be arranged transversely, and more preferably perpendicular, to the main guide rail 42 and tiered vertically, which is to say arranged one above the other, so as to both end at the same abscissa value along said main guide rail 42 and therefore at the same axial location facing the drum 6.

Thus, the carcass ply 4 and then the crown ply 71 may be conveyed successively, by said conveyor belts 13, 73, to the same location in the tire-building zone 2 so as to be wound onto the drum 6, making it possible to save on movements of the drum supporting structure 7.

In order to achieve this first embodiment variant, a crown ply preparation device 80, which feeds the second conveyor belt 73 with crown plies 71, may advantageously be installed upstream of the second conveyor belt 73, and more generally upstream of the first conveying system 10.

Said crown ply preparation device 80 preferably comprises a payout device 81 intended to accept a reel 82 containing a base strip 83 of elastomeric material containing crown ply reinforcers 72, and a cutting tool 84 designed to cut through the base strip 83, across the entire width, at a cutting angle which corresponds to the angle of the crown ply reinforcers 72, so as to detach from said base strip successive widths of which each has a length equal to the length desired for the crown ply 71, and thus forms said crown ply 71.

Figure 5:
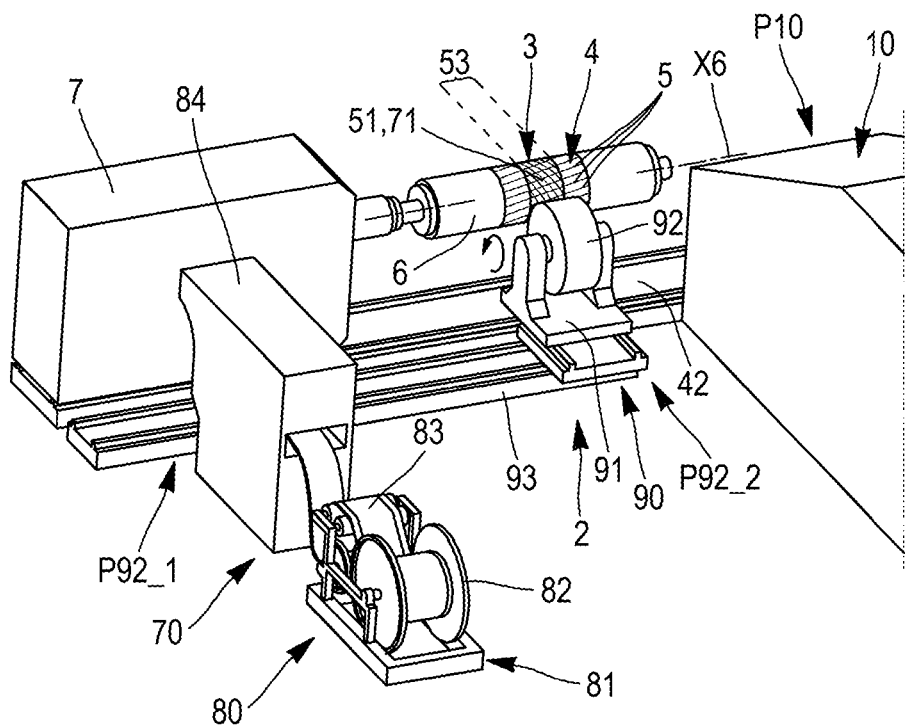
FIG. 5 illustrates, in a perspective view, the machine of FIGS. 3 and 4, in which machine the crown ply coming off the auxiliary dispenser has been wound onto the drum on top of the carcass ply in order to integrate said crown ply with the carcass entity.

According to a second embodiment variant, illustrated in FIGS. 3, 4 and 5, the crown ply 71 may be conveyed by means of an auxiliary dispenser 90, which is distinct and axially distant from the first conveying system 10.

Said auxiliary dispenser 90 may comprise a crown ply preparation device 80 as described above, but this time arranged axially offset from the first conveying system 10, some distance therefrom, and preferably toward the outside, which is to say that said crown ply preparation device 80 will be installed, in the longitudinal direction of the main guide rail 42, axially further away from the assembling zone 40 than the first conveying system 10 is.

As a preference, the auxiliary dispenser 90 will further comprise a carriage 91, provided with an applicator roller 92 and mounted mobile, preferably on an auxiliary guide rail 93 parallel to the main guide rail 42, so as to move between, on the one hand, a receiving position P92_1, situated axially facing the crown ply preparation device 80, and in which position the applicator roller 92 is able to receive the crown ply 71 coming from said crown ply preparation device 80 and more particularly coming from the cutting tool 84, and, on the other hand, an application position P92_2, in which the applicator roller 92 is able to transfer the crown ply 71 onto the drum 6 around the carcass ply 4.

As a preference, the application position P92_2 is, as can be seen in FIGS. 4 and 5, situated in an intermediate position comprised axially between the receiving position P92_1 and the axial position P10 in which the first conveying system 10 ends facing the drum 6 in order to be able to lay the carcass ply 4.

As a preference, the axis of the applicator roller 92 is parallel to the central axis X6 of the drum 6, so that the crown ply 71 can be transferred by pressing the applicator roller 92, laden with the crown ply 71, against the drum and by simultaneously making the drum 6 and the applicator roller 92 rotate in opposite directions.

Of course, the applicator roller 92 will be dimensioned so as to be able to receive the crown ply 71 and convey same as far as the drum 6 and then transfer said crown ply 71 onto the drum 6.

In particular, the axial width of the applicator roller 92 will be equal to or greater than the axial width of the crown ply 71.

Likewise, the circumference of the applicator roller 92 will have a length strictly greater than the overall length of the crown ply 71, said overall length meaning the length of said crown ply 71 measured from the head end 71F, in this instance the pointed tip of the head end, as far as the tail end 71R most distant from said head end 71F.

In that way, the head end 71F and tail end 71R of the crown ply 71 will never be able to meet, and especially will never be able to overlap, or even overlap in azimuth about the central axis of the applicator roller 92 when the crown ply 71 is wound on said applicator roller 92. Thus the crown ply 71 remains not only open, insofar as it will not be closed into a ring on itself, when it is on the applicator roller 92, but also open enough that when the applicator roller 92 presses the head end 71F against the drum 6 (FIG. 4), the tail end 71R remains at some distance from the region of contact between the applicator roller 92 and the drum 6 and therefore does not become trapped between the applicator roller 92 and the drum 6, which means that the tail end pointed tip of the crown ply 71 does not interfere with the laying of the head end pointed tip of this same crown ply 71 on the drum 6.

In practice, the applicator roller 92 will therefore notably have a diameter strictly greater than the initial, non-expanded, diameter of the drum 6.

The auxiliary dispenser 90, and more particularly the back and forth axial movements of the carriage 91 along the auxiliary guide rail 93, and the rotation of the applicator roller 92, will be managed by the control unit 60 and may be achieved by means of electric motors.

According to a third embodiment variant, illustrated in FIGS. 6, 7, 8, 9 and 10, indirect conveying of the crown ply 71 may be envisioned, whereby first of all the crown ply 71 is initially conveyed towards, or even as far as, the finishing zone 20, as is the case when said crown ply 71 is to be integrated into the crown entity 21 in order to produce a tire with a conventional radial architecture, without biasing the crown, and then said crown ply 71 is transferred towards and as far as the tire-building zone 2 in order to integrate it into the carcass entity 3 rather than into the crown entity 21.

Figure 8:
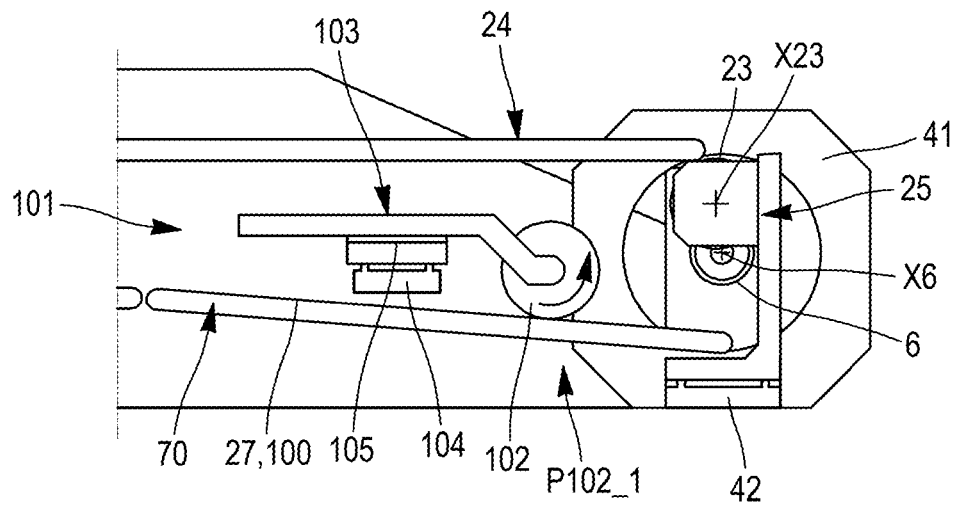
FIG. 8 is a side view of the machine of FIG. 7.
Figure 9:
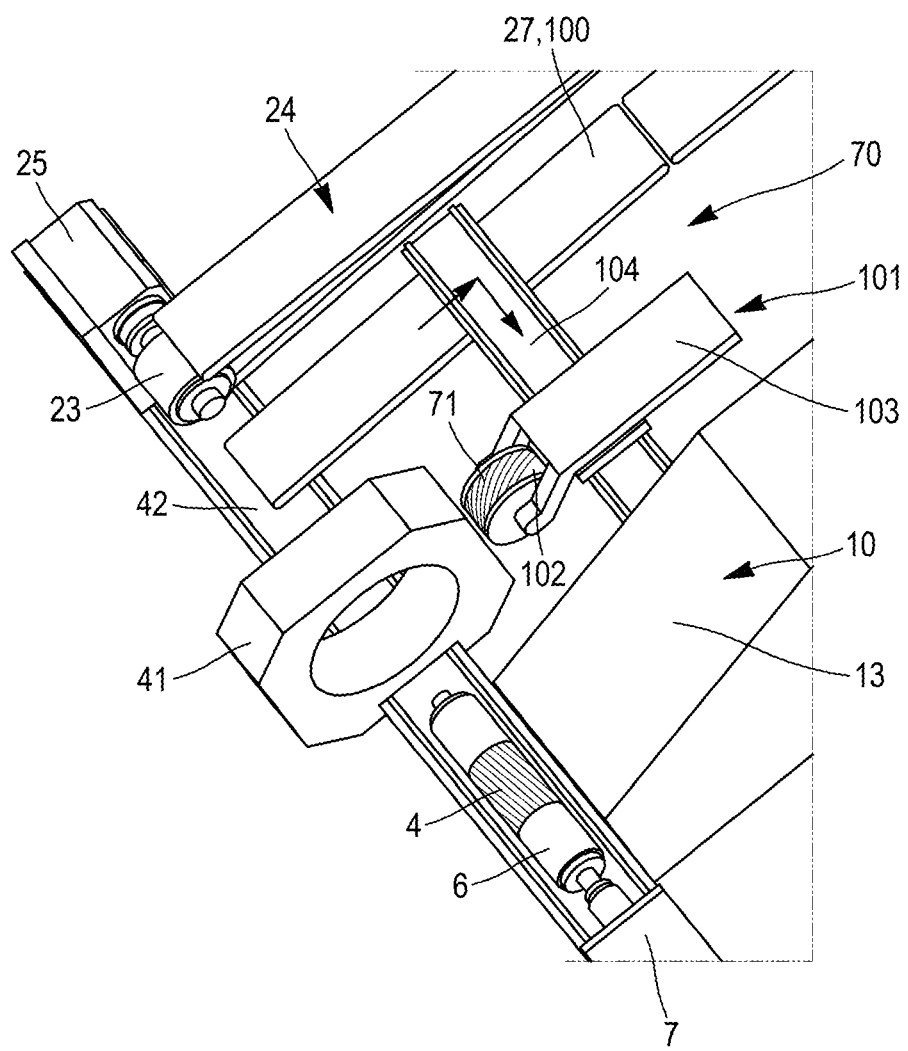
FIG. 9 illustrates, in a perspective view, the machine of FIGS. 6 to 8 when the distribution device, carrying the crown ply, is bypassing the transfer ring and the assembling zone in order to transfer said crown ply from the finishing zone to the tire-building zone.
Figure 10:
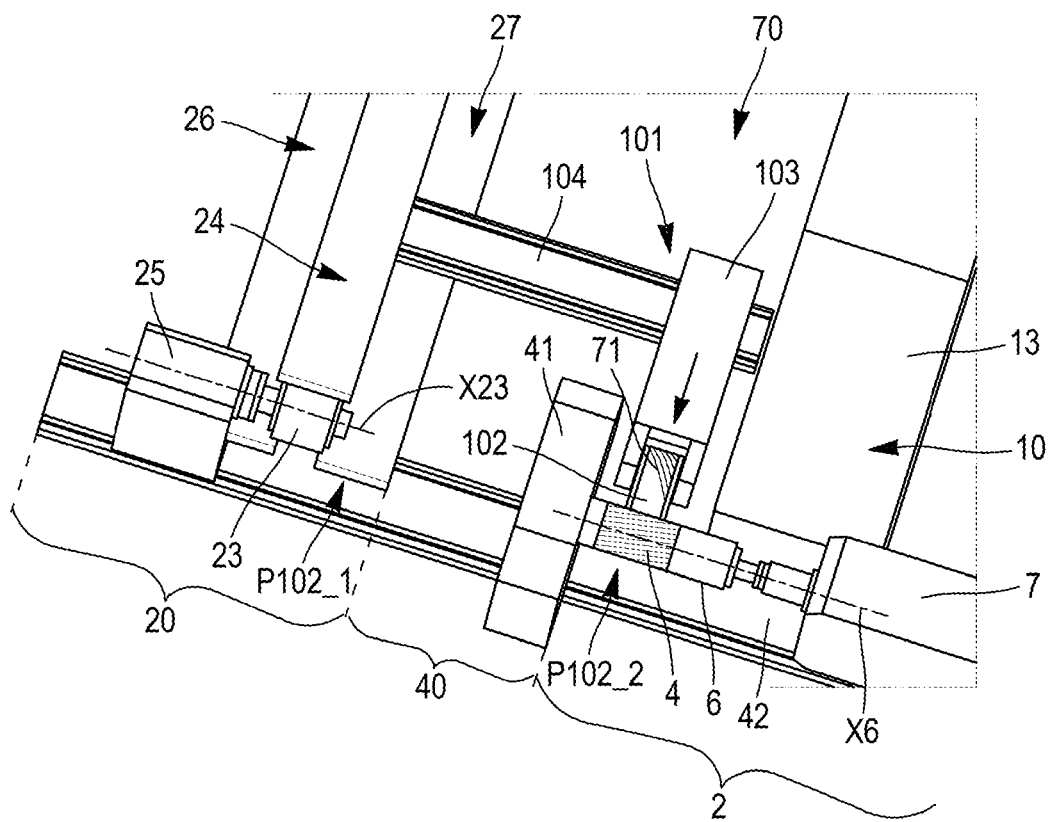
FIG. 10 is a perspective view of the machine of FIGS. 6 to 9 once the distribution device has positioned itself axially in the tire-building zone, facing the drum.
Figure 11:
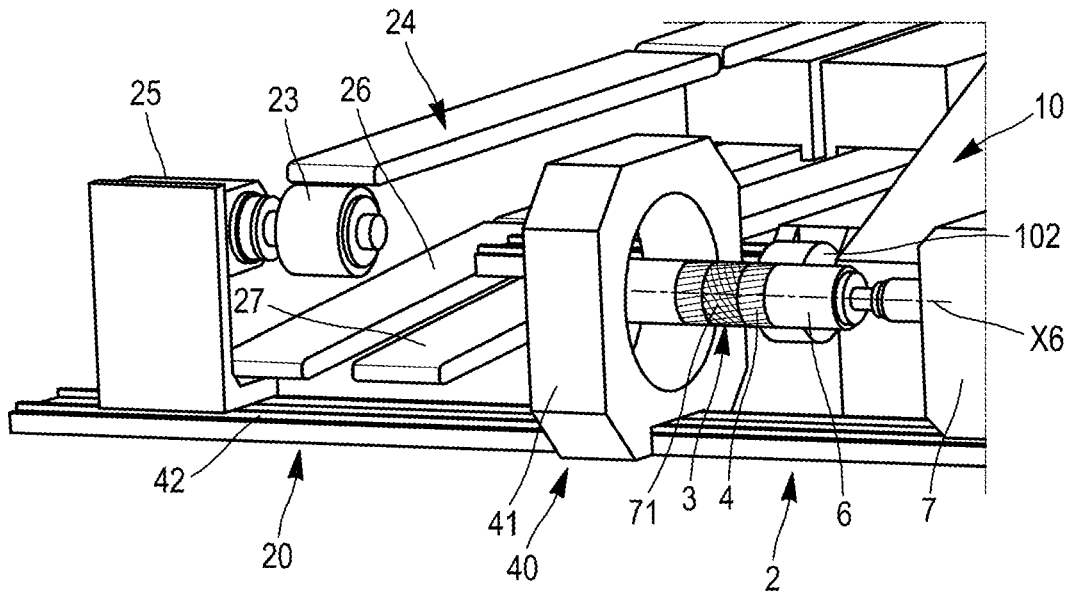
FIG. 11 illustrates, in a perspective view, the machine of FIGS. 6 to 10, in which machine the crown ply coming off the distribution device has been wound onto the drum on top of the carcass ply in order to integrate said crown ply with the carcass entity.

As a preference, according to this third variant, the third conveying system 70 comprises, on the one hand, a feed conveyor 100, which conveys the crown ply 71 into the finishing zone 20, and, on the other hand, a distribution device 101 which is designed to pick up the crown ply 71 conveyed by the feed conveyor 100 in the finishing zone 2 as visible in FIGS. 6 to 8, and then transport said crown ply 71 as far as the tire-building drum 6 in the tire-building zone 2, as illustrated in FIGS. 10 and 11, bypassing the assembling zone 40 and the transfer device 41 thereof, as visible in FIG. 9.

As visible in FIGS. 6 to 11, the distribution device 101 may comprise an intermediate roller 102 which is mounted with the ability to move between, on the one hand, a pickup position P102_1, which is situated in the finishing zone 20 and in which said intermediate roller 102 picks up the crown ply 71 from the feed conveyor 100, as visible in FIGS. 6 and 7, and, on the other hand, an off-loading position P102_2 which is situated in the tire-building zone 2 and in which said intermediate roller 102, as visible in FIGS. 10 and 11, applies the crown ply 71 to the tire-building drum 6 to integrate said crown ply 71 into the carcass entity 3 before the shaping operation.

As a preference, the intermediate roller 102 is supported by a carriage 103 mounted mobile on an auxiliary guide rail 104, preferably parallel to the main guide rail 42. The central axis of rotation of the intermediate roller 102 is preferably parallel to the drum central axis X6.

The carriage 103 further preferably comprises a reversing table 105, which allows a translational movement in a direction that is transverse, preferably perpendicular, to the main guide rail 42 and more generally perpendicular to the central axes X6 of the drum and X23 of the shell ring.

This reversing table 105, which preferably crosses the auxiliary guide rail 104 at right angles, advantageously allows the intermediate roller 102 to perform, alternately, on the one hand, reversing movements that allow the intermediate roller 102 to be moved away from the main guide rail 42 and from the central axes X6 of the drum and X23 of the shell ring so as to allow said intermediate roller 102 to move around and overcome the obstacle formed by the transfer ring 41, as visible in FIG. 9, and, on the other hand, forward movements that allow the intermediate roller 102 to be brought closer again to the main guide rail 42 and to the drum central axis X6 so as to notably allow said intermediate roller 102 to collaborate with the drum 6 in the tire-building zone 2 so as to set down the crown ply 71 therein.

In order to make the machine 1 more compact, the reversing movements of the intermediate roller 102 are performed towards the rear of the machine, moving back toward the upstream end of the feed conveyor 100 and more generally moving back toward the upstream end of the conveying systems 10, 24, 26, 27, 70, on the side of said conveying systems with respect to the main guide rail 42.

Likewise, in order to limit the footprint of the machine 1 while at the same time avoiding interference between the various systems and devices of the machine, the off-loading position 102_2 in the tire-building zone 2 will preferably be situated axially, along the main guide rail 42, between the first conveying system 10 and the transfer ring 41, as visible in FIG. 10.

As a preference, in the pickup position P102_1, the intermediate roller 102 will pick up the crown ply 71 on the belt of the feed conveyor 100 by peeling it off, as it rolls along said belt.

The intermediate roller 102 may be rotated either while keeping the central axis of said intermediate roller 102 in a fixed position, or while said central axis of the intermediate roller 102 is performing a reversing movement. In the latter instance, the carriage 103 may be designed to be able to accommodate a potential variation in the height of the central axis of the intermediate roller 102, notably a vertical elevation of said axis if the belt of the conveyor 100 is sloping (as is the case in FIG. 8), and if the intermediate roller 102 is moving back up said slope during its reversing movement.

Similarly, the transfer of the crown ply 71 from the intermediate roller 102 onto the drum 6 will preferably be performed by pressing the intermediate roller 102 bearing the crown ply 71 against the drum 6 and by making the drum 6 and the intermediate roller 102 rotate in opposite directions.

Of course, the axial width and the circumferential length of the intermediate roller 102 will be suited to the transport and transfer of the crown ply 71 in a similar way to that which was described above with reference to the applicator roller 92. Thus, in particular, the intermediate roller 102 will have a circumference strictly greater than the overall length of the crown ply 71, a diameter strictly greater than the base, non-expanded, diameter of the drum 6, and an axial width greater than the width of the crown ply 71.

As a preference, the translational movement of the carriage 103 along the auxiliary guide rail 104, the translational movement on the reversing table 105, and the rotational movement of the intermediate roller 102 will be controlled by the control unit 60, and preferably brought about by means of electric motors.

It will also be noted that, as a preference, the components of the third conveying system 70 which are intended to convey, manipulate and transfer the carcass ply 4, such as the second conveyor belt 73, the applicator roller 92 of the auxiliary dispenser 90, the feed conveyor 100 and the intermediate roller 102, will preferably be provided with a magnetization system, so as to be able to retain the carcass ply 4 through magnetic adhesion.

In the particular case of the third variant described hereinabove, provision may be made for the system that magnetizes the feed conveyor 100 to be able, in the terminal zone of the feed conveyor 100, which is the zone in which the intermediate roller is able to come and pick up the carcass ply 4 by peeling it off, to alternately adopt an active configuration in which it applies a magnetic field strong enough to hold the carcass ply 4 pressed intimately against the surface of said feed conveyor until such point as said carcass ply 4 reaches the drum 6, and a deactivated configuration in which the magnetic field strength is reduced or even the field is eliminated in said terminal zone, so that it becomes weaker than the field of magnetic attraction applied by the intermediate roller 102, so that the carcass ply 4 can be transferred from the feed conveyor 100, from which the carcass ply 4 detaches, to the intermediate roller 102.

The system for magnetizing the feed conveyor 100 may comprise magnets, preferably permanent magnets, placed on a magnetic base positioned beneath the surface of said feed conveyor 100, parallel to said surface. The transition from the active configuration to the deactivated configuration, and vice versa, may therefore be achieved for example by moving the magnetic base away from the surface of the feed conveyor 100 and, reciprocally, by moving said magnetic base closer to the surface of the feed conveyor 100.

According to one particularly preferred possible arrangement, which in absolute terms may be applied to any machine 1 according to the disclosure and, in particular, to any one of the first, second and third embodiment variants described in the foregoing, the control unit 60 is associated with a selector 61 making it possible either to activate or to deactivate the biasing system 50 so that the control unit 60 can make the machine 1 execute respectively either a biased-crown tire manufacturing cycle, during which a biasing structure 51 is associated with the carcass entity 3 so as to modify the orientation of the carcass reinforcers 5 in the zone of overlap 53 during the shaping operation, or a so-called "conventional radial architecture" tire manufacturing cycle during which the shaping operation is performed without a biasing structure 51 having been associated with the carcass entity 3.

Advantageously, such a machine 1 will be particularly multifunctional, because it will allow production to be diversified as required and notably allow production in the facility in which said machine 1 is installed to be easily adapted.

Advantageously, the selector 61 according to the disclosure will effectively allow a crown ply 71 to be integrated as required either into the carcass entity 3, so that said crown ply 71 will be united with the carcass ply 4 before shaping and will therefore bring about the desired biasing, or into the crown entity 21, so that said crown ply 71 will be united with the carcass ply 4 only after shaping.

Such a machine 1 will of course need to comprise, in addition to the biasing system 50 that can be used optionally as selected by the selector 61, the devices 24, 26, 27, and notably the conveying systems, that are necessary for conveying to the finishing zone 20 and for integrating into the crown entity 21, on the shell ring 23, the components necessary for obtaining a conventional radial architecture tire and here, more particularly, for conveying and integrating into the crown entity 21 a first crown ply and a second crown ply of which the reinforcers have a different direction from the reinforcers of the first crown ply.

For that purpose, said devices 24, 26, 27 in the finishing zone 20 will preferably include, aside from the second conveying system 24 designed for conveying the tread 22, and aside from the hooping-belt winding-on system, at least one conveying system 27 for conveying a first crown ply and a conveying system 26 for conveying a second crown ply, which conveying systems preferably take the form of two distinct conveyor belts ending at the finishing zone 20.

As indicated above, the shell-ring supporting structure 25 may move the shell ring 23, in the finishing zone 20, so as to present said shell ring 23 successively to face the conveying system 27 conveying the first crown ply, so as to receive the first crown ply, and then to face the conveying system 26 conveying the second crown ply, so as to receive the second crown ply around the first crown ply, and then to face the circumferential hooping-belt winding-on system, so as to be completed with the turns of a hooping belt which encircles the assembly formed by the first and second crown plies, and then finally to face the second conveying system 24 which delivers the tread 22, on top of the hooping belt.

The crown entity 21 thus formed, comprising (at least) the two crown plies of which the reinforcers cross one another, will then be added to a carcass entity 3, which itself contains the carcass ply 4 (as well as the inner liner and the outer sidewalls, as stated above), but which does not include a crown ply 71, and which will have been created beforehand in the tire-building zone 2, then shaped by expanding the drum 6 but not biased, because of the absence of a biasing structure 51.

By way of nonlimiting example, the selector 61 may notably be employed in the third embodiment variant described above and which is depicted in FIGS. 6 to 11.

According to such an example, the feed conveyor 100 of the third conveying system 70 may be designed to be able to collaborate selectively either with the shell ring 23, in the finishing zone 20, so as to set down and wind the crown ply 71 (when said crown ply 71 is intended to form the first of two crown plies of a conventional radial architecture tire) on the shell ring 23 and thus integrate said crown ply 71 into the crown entity 21 before said crown entity 21 is transferred and set down by the transfer device 41 on the shaped carcass entity 3, or with the intermediate roller 102 which belongs to the distribution device 101 and which is mounted with the ability to move between, on the one hand, a pickup position P102_1, which is situated in the finishing zone 20 and in which said intermediate roller 102 picks up the crown ply 71 from the feed conveyor 100 and, on the other hand, an off-loading position P102_2 which is situated in the tire-building zone 2 and in which said intermediate roller 102 applies the crown ply 71 to the tire-building drum 6 to integrate said crown ply 71 (which then forms the single crown ply of a biased-crown architecture tire) into the carcass entity 3 before the shaping operation.

According to such an embodiment variant, the feed conveyor 100 advantageously forms a branch which is common on the one hand to the conveying system 27 conveying the first crown ply, which system is used in the context of a conventional radial architecture tire manufacturing cycle, and, on the other hand, to the conveying system 70 conveying a single crown ply 71, which system is used in the context of a biased-crown tire manufacturing cycle. In the latter instance, the forking-off in the conveying of the crown ply 71, which fork is positioned downstream of the feed conveyor 100 and allows the crown ply 71 to be returned from the finishing zone 20 to the tire-building zone 2, is advantageously brought about by means of the distribution device 101 and the intermediate roller 102 thereof.

The way in which the various abovementioned embodiment variants work will now be described in greater detail with reference to the figures.

It will be noted that, by way of indication, whatever moreover the architecture of the tire that is manufactured, the angles formed by the filamentary reinforcing elements within a crown ply, or each of the (typically two) "crown plies" within the meaning of the disclosure, are preferably initially, before shaping, comprised between 4 degrees and 60 degrees, or even between 15 degrees and 50 degrees, with respect to the longitudinal direction of the crown ply concerned, and more preferably with respect to the circumferential direction C6. In any event, said crown ply angles will preferably be chosen so that, after shaping, and in the finished tire, the angle of the shaped crown ply is comprised between 15 degrees and 50 degrees, preferably between 18 degrees and 30 degrees with respect to the circumferential direction of the tire.

It will also be noted that, during the laying of a component based on an elastomeric material, of the ply 4, 71 type or of the tread 22 type, on the shell ring 23, on the drum 6 and where appropriate on top of another component that has already been laid, adhesion is preferably achieved simply as a result of the "tack" of the elastomeric material involved in the makeup of the component concerned.

Whatever the embodiment variant of the machine 1 concerned, if the selector 61 opts for a conventional radial architecture tire manufacturing cycle, then the crown entity 21 is produced by integrating into said crown entity at least two crown plies with mutually crossing respective reinforcers.

In order to do this, in the finishing zone 20, the shell ring 23 presents itself successively to face the conveying system 27 conveying the first crown ply 71, which lays and winds said first crown ply on said shell ring 23 as a first closed ring, then to face the conveying system 26 conveying the second crown ply, which lays a second crown ply on this same shell ring 23, winding this ply over and around the first crown ply, so as to form a second closed ring superposed with the first ring, and then preferably to face a system for laying a hooping belt by winding-on, then finally to face the conveying system 24 for conveying the tread 22, which system lays said tread on top of the hooping belt.

Once the "conventional" crown entity 21 has been thus formed, the shell-ring supporting structure 25 moves the shell ring 23 axially along the main guide rail 42 in order to leave the finishing zone 20 and reach the assembling zone 40 contiguous with said finishing zone 20 and aligns the central axis X23 of the shell ring 23 with the central axis X41 of the transfer ring 41 so as to engage the shell ring and the crown entity 21 inside said transfer ring 41, in this instance from the left side in FIGS. 1, 3, 6.

The crown entity 21 is then picked up by the transfer ring 41 and placed on standby in the assembling zone 40.

The shell-ring supporting structure 25 then executes a return movement, in the opposite direction to the previous movement, so as to extract the shell ring 23 from the transfer ring 41 in order to free up access to the inside of said transfer ring 41, and then return the shell ring 23 to its initial position in the finishing zone 20.

During this time, the carcass entity 3 is produced in the tire-building zone 2. To do that, the first conveying system 10 successively conveys and lays on the drum 6, by winding them in superposed closed rings, the complex comprising (at least) the inner liner and the outer sidewalls, then, over and around said complex, the carcass ply 4, thus forming a cylindrical annular carcass entity 3.

Insofar as it is appropriate not to associate a biasing structure 51 with this carcass entity 3, a crown ply is not, in this instance, incorporated therewith.

The bead wires 11, 12 and, more particularly, the corresponding "bead entities" are then engaged on the drum 6 over the carcass entity 3.

The drum 6 then expands the carcass entity 3 to give it a toroidal shape. The sidewalls are then folded over the bead wires 11, 12 and pressed against the carcass ply 4 by rolling with a fudging wheel.

The drum 6 and the carcass entity 3 are then contracted slightly so that the carcass entity 3 maintains an expanded toroidal shape, with an outside diameter greater than the initial "laid flat" diameter that said carcass entity 3 had before shaping, when laid on the drum 6, but with an outside diameter strictly smaller than the inside diameter of the crown entity 21 standing by in the transfer ring 41.

The drum supporting structure 7 then slides axially along the main guide rail 42 to leave the tire-building zone 2 and bring the drum 6 and the thus shaped carcass entity 3 it bears into the contiguous assembling zone 40 until said drum 6 and its carcass entity 3 enter the transfer ring 41, inside the annular element formed by the awaiting crown entity 21.

In the position thus inserted inside the transfer ring 41, the carcass entity 3 and the crown entity 21, as well as preferably the transfer ring 41 itself, are coaxial. Furthermore, the carcass entity 3 and the crown entity 21 then occupy axially, along the main guide rail 42, the same range of abscissa values, so that they axially overlap coinciding with one another for perfect superposition.

The drum 6 then performs a further radial expansion of the carcass entity 3 to bring it into contact with the interior face of the crown entity 21 so that the transfer ring 41 can lay and fix said crown entity 21 on said shaped carcass entity 3.

The conventional radial carcass architecture tire thus obtained is then removed from the drum 6 and said drum 6 moves away from the assembling zone 40 to return to the tire-building zone 2 facing the first conveying system 10 awaiting the start of a next cycle.

If the selector 61 opts for the manufacture of a biased-crown tire, the method will be as follows. For the sake of economy of description, only those steps or sub-steps that differ from those carried out for manufacturing a conventional radial architecture tire will be detailed.

The manufacture of the crown entity 21 this time does not require a crown ply within the meaning indicated above, and proceeds according to step (a) mentioned above.

For this purpose, the shell ring 23 is positioned successively, in the finishing zone 20, in front of the winding-on device that lays the hooping belt on the shell ring 23 by winding a continuous reinforced strip in turns, then in front of the second conveying system 24, which lays the tread 22 in a closed ring on the shell ring 23 on top of the hooping belt.

This specific crown entity 21 is then placed on standby in the transfer ring 41 within the assembling zone 40.

During this time, in the tire-building zone 2, the carcass entity 3 is prepared as follows, in accordance with step (b) mentioned above.

Sub-step (b1) of producing the carcass entity 3, which here includes the laying on the drum 6, by the first conveying system 10, of the complex comprising the inner liner and the outer sidewalls, and then the laying of the carcass ply 4, proceeds as described above.

Next, the crown ply 71 is conveyed and laid over the top of said carcass ply 4, to integrate said crown ply 71 into the carcass entity 3.

In the first embodiment variant, all that is required is for the drum 6 to be left on standby in the same axial position as said drum 6 occupied for receiving the carcass ply 4, facing the first conveying system 10, so that the third conveying system 70, and more particularly the second conveyor belt 73, can supply the crown ply 71 and wind it on said drum 6, in said same axial position, as visible in FIGS. 1 and 2.

In the second embodiment variant, on the other hand, after the carcass ply 4 has been laid, the drum supporting structure 7 causes the drum 6 to reverse axially along the main guide rail 42, away from the assembling zone 40 and finishing zone 20, to place the drum 6 in the application position P92_2, between the first conveying system 10 and the auxiliary dispenser 90, as visible in FIGS. 4 and 5, so that the applicator roller 92 can lay, by winding it onto said drum 6, around the carcass ply 3, the crown ply 71 arriving from the cutting tool 84 of the crown ply preparation device 80.

In the third embodiment variant, the crown ply 71 is initially conveyed by the feed conveyor 100 as far as the finishing zone 20, as if said crown ply were intended to integrate the crown entity 21. However, said crown ply 71 is intercepted by the distribution device 101 which, positioned in the pickup zone P102_1, picks up said crown ply 71 from said feed conveyor 100 of which the magnetization system will have been deactivated for that purpose, using the intermediate roller 102, and redirects said crown ply 71 towards the tire-building zone 2. For this purpose, the carriage 103 executes a movement, along the auxiliary guide rail 104, that allows the intermediate roller 102 to be extracted from the finishing zone 20, and transported, with the crown ply 71 it is carrying, beyond the assembling zone 40, moving around the transfer ring 41, until it is brought into the tire-building zone 2, between the first conveying system 10 and the transfer ring 41, in the off-loading position P102_2 in which said crown ply 71 is then laid by winding on the drum 6.

Whatever the embodiment variant considered, once the crown ply 71 has been laid and fixed on the carcass ply 4, the drum supporting structure 7 positions itself, along the main guide rail 42, in the tire-building zone 2 so that the drum 6 bearing the carcass entity 3 can accept the bead wires 11, 12 and, more particularly, the "bead entities", which are slipped over said drum, on either side of the zone of overlap 53.

There then follows the shaping and biasing step (b2) during the course of which the radial expansion of the carcass entity 3, brought about by the drum 6 and as depicted in FIG. 16, converts the cylindrical carcass entity 3 into a toroidal shaped carcass entity 3 and, above all, is accompanied here by a biasing, which is to say rotation of the ply reinforcers 5 with respect to the circumferential direction C6, in the zone of overlap 53.

While this is happening, in the zone of overlap 53, and as illustrated in FIG. 18, the carcass reinforcers 5 pass from the first angular orientation A5_1 to the third angular orientation A5_2, while, at the same time, the biasing reinforcers 52, and more particularly the crown ply reinforcers 72 which form same, pass from the second angular orientation A52_1 to a fourth angular orientation A52_2 distinct from the second angular orientation A52_1.

More particularly, the carcass reinforcers 5 and the biasing reinforcers 52, 72, which cross one another, may have a tendency, by performing with respect to one another rotations in opposite directions, to fold over towards the circumferential direction C6 of the drum 6 so that, in terms of absolute value, the third, final, angular orientation A5_2 of the carcass reinforcers 5, which is attained after shaping and maintained in the definitive tire, is less than the first angular orientation A5_1, whereas, similarly, the fourth, final, angular orientation A52_2 of the crown ply reinforcers 72 is less than the second angular orientation A52_1.

This then yields a carcass entity 3 with a biased crown and, more particularly, a biased carcass ply 4, preferably having a biased carcass ply 4/crown ply 71 assembly.

At the same time, the carcass reinforcers 5 which are situated outside of the zone of overlap 53, in the sidewalls which rise up substantially radially, in this instance substantially vertically, are oriented in radial planes. The twisting rotation of the ends of the carcass entity 3 and of the corresponding bead wires 11, 12 is advantageously accommodated by the rotational mobility of the cradles supporting said bead wires.

The drum supporting structure 7 is then moved along the main guide rail 42 in the direction of the assembling zone 40 until the drum 6 and its shaped and biased carcass entity 3 become inserted inside the transfer ring 41 in said assembling zone 40, in a way that is coaxial with and axially faces the awaiting crown entity 21.

As indicated previously, it is possible here also to contract the carcass entity 3 slightly so that said carcass entity 3 can be engaged without interference, but still in a toroidal shape, inside the ring formed by the crown entity 21, and then deploy said carcass entity 3 radially again so as to bring it into contact with the radially internal cylindrical face of the crown entity 21 and thus allow the transfer ring 41 to fix said crown entity 21 on said carcass entity 3, as illustrated in FIG. 17.

Once the tire thus built is extracted from the drum 6, said drum 6 moves away from the assembling zone 40 and from the finishing zone 20, in the opposite direction to the shell ring 23, and regains its initial position, in the tire-building zone 2, preferably axially facing the first conveying system 10, where said drum 6 stands ready to receive a new complex and a new carcass ply 4.

Of course, the disclosure is in no way limited only to the embodiment variants described in the preceding text, a person skilled in the art being notably capable of isolating or freely combining one or another of the abovementioned features with one another, or of substituting equivalents therefor.

What is claimed is:

1. A machine for the automatic manufacture of a tire, said machine comprising:

a first zone referred to as "tire-building zone", designed to produce a first annular entity that forms part of the tire, known as the "carcass entity", which comprises at least one carcass ply provided with a first set of filamentary reinforcing elements referred to as "carcass reinforcers", said tire-building zone for this purpose comprising a tire-building drum which has a drum central axis and which is mounted to rotate about said drum central axis, and a first conveying system which is designed to lay the carcass ply on the tire-building drum by winding it over said tire-building drum about the drum central axis so that the carcass reinforcers exhibit, with respect to a circumferential direction of the drum, a first angular orientation, a second zone referred to as the "finishing zone", designed to produce a second annular entity that forms part of the tire, known as the "crown entity", which comprises at least a tread, said finishing zone for this purpose comprising a shell ring mounted to rotate about a shell-ring central axis, and a second conveying system for laying the tread by winding on the shell ring about the shell-ring central axis, a shaping system designed to perform a shaping operation which causes the carcass entity present on the tire-building drum to expand radially in order to obtain a shaped carcass entity of toroidal shape, a third zone referred to as the "assembling zone", designed to assemble the crown entity concentrically on the shaped carcass entity so as to obtain a tire, said assembling zone for this purpose comprising a transfer device of the transfer-ring type, which is designed to receive the crown entity coming from the shell ring of the finishing zone and transfer said crown entity onto and around the shaped carcass entity, a biasing system which is designed to bring into contact with the carcass entity, prior to the shaping operation, an annular structure referred to as a "biasing structure", which is centered on the drum central axis and provided with a second set of filamentary reinforcing elements referred to as "biasing reinforcers" which exhibit, with respect to the circumferential direction of the drum, a second angular orientation, which is different from the first angular orientation of the carcass reinforcers, said biasing structure extending in such a way as to partially straddle the carcass ply along the drum central axis in a zone referred to as the "zone of overlap" so that during the shaping operation, the biasing reinforcers interact with the carcass reinforcers so as to modify, in the zone of overlap, the angular orientation of said carcass reinforcers with respect to the circumferential direction of the drum and so that in this way there is obtained a shaped and biased carcass entity, an automatic control unit which comprises at least a program enabling automatic execution by the machine of a cycle known as a "biased-crown tire manufacturing cycle" which comprises a step (a) of producing a crown entity in the finishing zone, a step (b) of preparing a shaped and biased carcass entity which step comprises a sub-step (b1) of creating a carcass entity in the tire-building zone and then a shaping and biasing sub-step (b2) during which said carcass entity coming from the tire-building zone is shaped and biased in order to obtain a shaped and biased carcass entity, said cycle making provision for the step (a) of producing the crown entity to overlap in time with at least part of the step (b) of preparing the carcass entity so that at least part of the production of the crown entity is performed in parallel with the preparation of the carcass entity, and then finally an assembling step (c) during which, in the assembling zone, the transfer device places and fixes the crown entity on the shaped and biased carcass entity so as to obtain a tire.

2. The machine according to claim 1, wherein the tire-building drum, the transfer device and the shell ring are aligned in this order along the one same rectilinear main guide rail so that the shell ring can move back and forth along said main guide rail from the finishing zone as far as the assembling zone in order to set down the crown entity in the transfer device, whereas the tire-building drum can move back and forth from the tire-building zone as far as the assembling zone to present the shaped carcass entity, in the transfer device, to axially face the crown entity contained in said transfer device.

3. The machine according to claim 1, it wherein the machine comprises a third conveying system designed to convey a ply referred to as "crown ply", intended to integrate the between the carcass ply and the tread so as to reinforce said tire, said crown ply for this purpose comprising a layer of elastomeric material which extends in a longitudinal direction, from a head end as far as a tail end, and within which there are filamentary reinforcing elements referred to as "crown ply reinforcers" which are arranged parallel to one another at a predetermined angle referred to as the "crown ply angle" with respect to the longitudinal direction.

4. The machine according to claim 3, wherein the biasing system uses the crown ply as a biasing structure so that the crown ply reinforcers form the biasing reinforcers, and wherein the third conveying system is for this purpose designed to convey the crown ply into the tire-building zone and to wind said crown ply onto the tire-building drum until the tail end of said crown ply closes onto the head end so as to integrate said crown ply into the carcass entity prior to the shaping operation.

5. The machine according to claim 3, wherein the third conveying system comprises a feed conveyor which conveys the crown ply into the finishing zone, and a distribution device which is designed to pick up the crown ply conveyed by the feed conveyor in the finishing zone and then transport said crown ply as far as the tire-building drum in the tire-building zone, bypassing the assembling zone and the transfer device thereof.

6. The machine according to claim 5, wherein the feed conveyor of the third conveying system is designed to be able to collaborate selectively either with the shell ring, in the finishing zone, so as to set down and wind the crown ply on the shell ring and thus integrate said crown ply into the crown entity before said crown entity is transferred and set down by the transfer device on the shaped carcass entity, or with an intermediate roller which belongs to the distribution device and which is mounted with the ability to move between a pickup position, which is situated in the finishing zone and in which said intermediate roller picks up the crown ply from the feed conveyor, and an off-loading position which is situated in the tire building zone and in which said intermediate roller applies the crown ply to the tire-building drum to integrate said crown ply into the carcass entity before the shaping operation.

7. The machine according to claim 1, wherein the biasing system uses, as biasing structure, a biasing sleeve which contains the biasing reinforcers and which forms an integral part of the tire-building drum on which the carcass ply is set down so that said biasing sleeve can act as a reusable biasing structure which interacts temporarily with the carcass entity when the tire-building drum is being radially expanded in order to perform the shaping operation, and is then separated from the tire when said tire is removed from the tire-building drum.

8. The machine according to claim 1, wherein the control unit is associated with a selector making it possible either to activate or to deactivate the biasing system so that the control unit can make the machine execute respectively either a biased-crown tire manufacturing cycle, during which a biasing structure is associated with the carcass entity so as to modify the orientation of the carcass reinforcers in the zone of overlap during the shaping operation, or a so-called "conventional radial architecture" tire manufacturing cycle during which the shaping operation is performed without a biasing structure having been associated with the carcass entity.

\* \* \* \* \*